(12) United States Patent
You et al.

(10) Patent No.: US 9,809,744 B2
(45) Date of Patent: Nov. 7, 2017

(54) FLUORIDE PHOSPHOR COMPOSITE, METHOD OF MANUFACTURING FLUORIDE PHOSPHOR COMPOSITE, WHITE LIGHT EMITTING APPARATUS, DISPLAY APPARATUS, LIGHTING DEVICE, AND ELECTRONIC DEVICE

(71) Applicant: Samsung Electronics Co., Ltd., Suwon-si (KR)

(72) Inventors: Ji Ho You, Seoul (KR); In Hyung Lee, Hanam-si (KR); Tae Hoon Kim, Suwon-si (KR); Jong Won Park, Seoul (KR); Chul Soo Yoon, Suwon-si (KR); Chi Woo Lee, Cheonan-si (KR)

(73) Assignee: SAMSUNG ELECTRONICS CO., LTD., Samsung-ro, Yeongtong-gu, Suwon-si Gyeonggi-do (KR)

( * ) Notice: Subject to any disclaimer, the term of this patent is extended or adjusted under 35 U.S.C. 154(b) by 0 days.

(21) Appl. No.: 14/963,268

(22) Filed: Dec. 9, 2015

(65) Prior Publication Data
US 2016/0160122 A1    Jun. 9, 2016

(30) Foreign Application Priority Data
Dec. 9, 2014 (KR) ........................ 10-2014-0175659

(51) Int. Cl.
| | | |
|---|---|---|
| B32B 5/16 | (2006.01) | |
| C09K 11/57 | (2006.01) | |
| C09K 11/61 | (2006.01) | |
| C09K 11/02 | (2006.01) | |

(52) U.S. Cl.
CPC .......... *C09K 11/617* (2013.01); *C09K 11/025* (2013.01); *C09K 11/57* (2013.01); *C09K 11/61* (2013.01); *Y02B 20/181* (2013.01)

(58) Field of Classification Search
USPC .................................. 428/403, 696, 697, 700
See application file for complete search history.

(56) References Cited

U.S. PATENT DOCUMENTS

| | | |
|---|---|---|
| 3,576,756 A | 4/1971 | Russo |
| 4,473,634 A | 9/1984 | Dodds et al. |
| 6,372,608 B1 | 4/2002 | Shimoda et al. |
| 6,645,830 B2 | 11/2003 | Shimoda et al. |
| RE38,466 E | 3/2004 | Inoue et al. |

(Continued)

FOREIGN PATENT DOCUMENTS

| | | |
|---|---|---|
| JP | 2014-145047 A | 8/2014 |
| KR | 10-0741567 B1 | 7/2007 |
| KR | 10-2014-0025077 A | 3/2014 |

*Primary Examiner* — Holly Le
(74) *Attorney, Agent, or Firm* — Muir Patent Law, PLLC

(57) ABSTRACT

There is provided a fluoride phosphor composite including: fluoride phosphor core particles that may be expressed by the empirical formula $A_xMF_y:Mn^{4+}$, wherein A may be at least one selected from the group consisting of Li, Na, K, Rb, and Cs, M may be at least one selected from the group consisting of Si, Ti, Zr, Hf, Ge, and Sn, the composition ratio (x) of A may satisfy $2 \leq x \leq 3$, the composition ratio (y) of F may satisfy $4 \leq y \leq 7$, each fluoride phosphor composite particle may be coated with a Mn-free fluoride coating. The Mn-free fluoride coating may have a thickness less than or equal to 35% of the size of each fluoride phosphor composite particle.

20 Claims, 23 Drawing Sheets

(56) References Cited

U.S. PATENT DOCUMENTS

| | | |
|---|---|---|
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,288,758 B2 | 10/2007 | Sherrer et al. |
| 7,319,044 B2 | 1/2008 | Han et al. |
| 7,497,973 B2 | 3/2009 | Radkov et al. |
| 7,501,656 B2 | 3/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,057,706 B1 | 11/2011 | Setlur et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,377,334 B2 | 2/2013 | Lyons |
| 8,399,944 B2 | 3/2013 | Kwak et al. |
| 8,432,511 B2 | 4/2013 | Jeong |
| 8,459,832 B2 | 6/2013 | Kim |
| 8,502,242 B2 | 8/2013 | Kim |
| 8,536,604 B2 | 9/2013 | Kwak et al. |
| 8,637,156 B2 | 1/2014 | Weimer et al. |
| 8,710,487 B2 | 4/2014 | Lyons et al. |
| 8,729,790 B2 | 5/2014 | Seibel, II et al. |
| 8,735,931 B2 | 5/2014 | Han et al. |
| 8,766,295 B2 | 7/2014 | Kim |
| 2004/0229154 A1* | 11/2004 | Shoji ............... C09K 11/616 430/139 |
| 2005/0040765 A1* | 2/2005 | Okumura ......... C09K 11/025 313/582 |
| 2006/0169998 A1* | 8/2006 | Radkov ............ C09K 11/617 257/98 |
| 2007/0125982 A1 | 6/2007 | Tian et al. |
| 2007/0125984 A1 | 6/2007 | Tian et al. |
| 2008/0128679 A1 | 6/2008 | Tian et al. |
| 2008/0305334 A1 | 12/2008 | Jang et al. |
| 2009/0020775 A1 | 1/2009 | Radkov et al. |
| 2010/0142189 A1* | 6/2010 | Hong ............... C09K 11/616 362/97.3 |
| 2010/0264809 A1 | 10/2010 | Winkler et al. |
| 2012/0256125 A1* | 10/2012 | Kaneyoshi ............ C01B 9/08 252/301.4 F |
| 2012/0299466 A1 | 11/2012 | Lyons et al. |
| 2013/0241399 A1 | 9/2013 | Masai et al. |
| 2013/0264937 A1 | 10/2013 | Sakuta et al. |
| 2014/0054634 A1 | 2/2014 | Fukuda et al. |
| 2014/0131752 A1 | 5/2014 | Kondo et al. |

\* cited by examiner

FLUORIDE PHOSPHOR COMPOSITE, METHOD OF MANUFACTURING FLUORIDE PHOSPHOR COMPOSITE, WHITE LIGHT EMITTING APPARATUS, DISPLAY APPARATUS, LIGHTING DEVICE, AND ELECTRONIC DEVICE

CROSS-REFERENCE TO RELATED APPLICATION

This application claims priority under 35 U.S.C. §119 to Korean Patent Application No. 10-2014-0175659 filed on Dec. 9, 2014, with the Korean Intellectual Property Office, the entire disclosure of which is incorporated herein by reference.

BACKGROUND

The present inventive concept relates to a fluoride phosphor composite, a method for manufacturing a fluoride phosphor composite, a light emitting device, a display apparatus, and a lighting device.

Semiconductor light emitting devices emit light using the principle of electron-hole recombination when a current is applied thereto, and due to various inherent advantages thereof, such as low power consumption, high luminance, and compactness, semiconductor light emitting devices have been commonly used as light sources. In particular, since the development of nitride-based light emitting devices, semiconductor light emitting devices have been extensively utilized and employed in backlight units, household lighting devices, vehicle lighting, and the like.

A light emitting apparatus using such a semiconductor light emitting device may have a light emitting device providing excitation light and a phosphor excited by the light emitted from the light emitting device to emit wavelength-converted light, thus realizing desired color characteristics. Improvements of phosphor having excellent characteristics in terms of color gamut, reliability, and the like, and a light emitting apparatus using such a phosphor is desired. In particular, an $Mn^{4+}$ activated fluoride phosphor may be very vulnerable to moisture, and due to this shortcoming, the durability and reliability of $Mn^{4+}$ activated fluoride phosphors may be sharply degraded under high temperature and/or high humidity atmosphere in which an $Mn^{4+}$ activated fluoride phosphor is often used.

SUMMARY

An aspect of the present inventive concept may provide a fluoride phosphor composite having enhanced optical properties and reliability and a manufacturing method thereof.

An aspect of the present inventive concept may also provide a light emitting apparatus having a fluoride phosphor composite and having enhanced optical properties and reliability, a display apparatus, and a lighting device.

According to an exemplary embodiment of the present inventive concept, a fluoride phosphor composite may include a fluoride phosphor core particle expressed by an empirical formula $A_xMF_y:Mn^{4+}$, wherein, in the empirical formula, A is at least one selected from the group consisting of Li, Na, K, Rb, and Cs, M is at least one selected from the group consisting of Si, Ti, Zr, Hf, Ge, and Sn, a composition ratio (x) of A satisfies $2 \leq x \leq 3$, a composition ratio (y) of F satisfies $4 \leq y \leq 7$, the fluoride phosphor core particle is coated with a Mn-free fluoride coating, and the Mn-free fluoride coating has a thickness less than or equal to 35% of the size of the fluoride phosphor composite.

The size of the fluoride phosphor composite may range from 5 μm to 25 μm in diameter. The thickness of the Mn-free fluoride coating may range from 0.1 μm to 5 μm. The thickness of the Mn-free fluoride coating may be less than or equal to 20% of the size of the fluoride phosphor composite.

The Mn-free fluoride coating may have a thickness equal to or greater than 1% of the size of the fluoride phosphor composite.

The Mn-free fluoride coating may include fluoride expressed by an empirical formula of $A_xMF_y$.

The external quantum efficiency of the fluoride phosphor composite may be greater than the external quantum efficiency of the fluoride phosphor core.

The external quantum efficiency of the fluoride phosphor composite may be less than 25% smaller than the external quantum efficiency of the fluoride phosphor core.

The internal quantum efficiency of the fluoride phosphor composite may be greater than the internal quantum efficiency of the fluoride phosphor core particle before being coated with the fluoride coating.

An external quantum efficiency of the fluoride phosphor composite may be equal to or greater than 80% of an initial external quantum efficiency when the fluoride phosphor is excited with a light having a wavelength equal to about 450 nm after the fluoride phosphor composite is preserved in an environment having a temperature equal to about 85° C. and relative humidity equal to about 85% for 15 hours.

The fluoride phosphor composite may further include an organic coating (i.e., organic material coating) applied to a surface of the Mn-free fluoride coating.

According to an exemplary embodiment of the present inventive concept, a fluoride phosphor composite may a include fluoride phosphor core particle expressed by an empirical formula of $A_xMF_y:Mn^{4+}$, wherein, in the empirical formula, A is at least one selected from the group consisting of Li, Na, K, Rb, and Cs, M is at least one selected from the group consisting of Si, Ti, Zr, Hf, Ge, and Sn, a composition ratio (x) of A satisfies $2 \leq x \leq 3$, a composition ratio (y) of F satisfies $4 \leq y \leq 7$, and the fluoride phosphor core particle is coated with an organic material.

The organic coating may include a hydrophobic organic material physically adsorbed on a surface of the flu fluoride phosphor core particle. The organic coating may include an organic compound having at least one functional group among a carboxyl group (—COOH) and an amine group (—$NH_2$) and having 4 to 18 carbon atoms.

After the fluoride phosphor composite is preserved in an environment having a temperature about 85° C. and relative humidity about 85% for 3 hours, when the fluoride phosphor composite is excited with light having a wavelength about 450 nm, external quantum efficiency of the fluoride phosphor composite may be equal to or greater than 130% of external quantum efficiency of the fluoride phosphor core particle before being coated under the same conditions.

According to an exemplary embodiment of the present inventive concept, a fluoride phosphor composite may include a fluoride phosphor core expressed by an empirical formula of $A_xMF_y:Mn^{4+}$, a first shell covering a surface of the fluoride phosphor core and having an Mn-free fluoride, and a second shell covering a surface of the first shell and having an organic material, wherein, in the empirical formula, A is at least one selected from the group consisting of Li, Na, K, Rb, and Cs, M is at least one selected from the group consisting of Si, Ti, Zr, Hf, Ge, and Sn, a composition ratio (x) of A satisfies 2≤x≤3, and a composition ratio (y) of F satisfies 4≤y≤7.

According to an exemplary embodiment of the present inventive concept, a method for preparing fluoride phosphor composite particles may include: introducing a first source material containing M and a fluoride containing $Mn^{4+}$ to a hydrofluoric (HF) solution in predetermined order; introducing a second source material containing A to the HF solution to form fluoride phosphor core particles expressed by an empirical formula of $A_xMF_y$:$Mn^{4+}$—one of the first and second source materials remaining after the fluoride phosphor core particles are formed; and additionally introducing the other of the first and second source materials to the HF solution with the fluoride phosphor core particles formed therein, to coat the fluoride phosphor core particles with an Mn-free fluoride shell to form fluoride phosphor composite particles, wherein M is at least one selected from the group consisting of Si, Ti, Zr, Hf, Ge, and Sn, A is at least one selected from the group consisting of Li, Na, K, Rb, and Cs, the composition ratio (x) of A satisfies 2≤x≤3, and the composition ratio (y) of F satisfies 4≤y≤7.

The method may further include: collecting the fluoride phosphor composite particles coated with the Mn-free fluoride shell; and introducing the fluoride phosphor composite particles and an organic material to a solvent to coat a surface of the Mn-free fluoride shell with the organic material.

The solvent may be acetone, and the organic material may include a hydrophobic organic material that can be physically adsorbed on a surface of each fluoride phosphor composite particle.

A mole ratio of the organic material to the fluoride phosphor composite particles may range from 1 to 4.

The method may further include: cleaning the fluoride phosphor composite particles between the collecting of the fluoride phosphor composite particles and the coating of the surface of the fluoride shell with the organic material.

The method may further include: cleaning the fluoride phosphor composite particles coated with the organic material, after the coating of the surface of the fluoride shell with the organic material, wherein the cleaning may be performed two or fewer times.

The preparing of the mixed HF solution may include: introducing a first source material containing M to a HF solution; and introducing a fluoride containing $Mn^{4+}$ to the HF solution including the first source material.

The $Mn^{4+}$-contained fluoride may include a manganese fluoride having a composition of $A_xMnF_y$. The first source material may include at least one selected from the group consisting of $H_xMF_y$, $A_xMF_y$, and $MO_2$. The second source material may include $AHF_2$.

After the fluoride phosphor core particles are formed, the second source material may remain, and the coating of the fluoride phosphor core particles with the Mn-free fluoride may include introducing the first source material.

According to an exemplary embodiment of the present inventive concept, a method for preparing fluoride phosphor composite particles may include: preparing a hydrofluoric (HF) solution by mixing a first source material containing M and a fluoride containing $Mn^{4+}$; introducing a second source material containing A to the HF solution to form fluoride phosphor core particles expressed by an empirical formula of $A_xMF_y$:$Mn^{4+}$; cleaning the fluoride phosphor core particles; and introducing the fluoride phosphor core particles and an organic material to a solvent to coat the fluoride phosphor core particles with the organic material, wherein M is at least one selected from the group consisting of Si, Ti, Zr, Hf, Ge, and Sn, A is at least one selected from the group consisting of Li, Na, K, Rb, and Cs, a composition ratio (x) of A satisfies 2≤x≤3, and a composition ratio (y) of F satisfies 4≤y≤7.

According to another aspect of the present inventive concept, a white light emitting apparatus may include: a semiconductor light emitting device emitting excitation light; the foregoing fluoride phosphor composite disposed around the semiconductor light emitting device to convert at least a portion of the excitation light into red light; and at least one light emitting element providing light having a wavelength different from the emission wavelength of the semiconductor light emitting device and the wavelength of the red light, wherein the at least one light emitting element is at least one of a different semiconductor light emitting device and a different phosphor.

According to an exemplary embodiment of the present inventive concept, a display apparatus including the foregoing fluoride phosphor composite as a wavelength conversion material may be provided. The display apparatus may include: an image display panel displaying an image; and a backlight unit providing light to the image display panel and having a light emitting diode (LED) light source module. The LED light source module may include a circuit board and a white light emitting apparatus mounted on the circuit board and having the foregoing fluoride phosphor.

According to an exemplary embodiment of the present inventive concept, a lighting device may include: a light emitting diode (LED) light source module; and a diffusion sheet disposed on the LED light source module and uniformly diffusing light emitted from the LED light source module, wherein the LED light source module includes a circuit board and a white light emitting apparatus mounted on the circuit board and having the foregoing fluoride phosphor.

According to an embodiment, an electronic device includes a fluoride phosphor composite having a fluoride phosphor core expressed by an empirical formula of $A_xMF_y$:$Mn^{4+}$ and a first shell coating the fluoride phosphor core, wherein A is Li, Na, K, Rb, or Cs, M is Si, Ti, Zr, Hf, Ge, or Sn, x satisfies 2≤x≤3, y satisfies 4≤y≤7, and the first shell is formed of a different material from the material of the fluoride phosphor core.

The first shell may be made of a Mn-free fluoride, and the first shell may be thinner than or equal to 35% of the diameter of the fluoride phosphor composite. The diameter of fluoride phosphor composite may range from 5 μm to 25 μm with respect to a mass median diameter (d50). The thickness of the first shell may range from 0.1 μm to 5 μm. The thickness of the first shell may be less than or equal to 20% of the diameter of the fluoride phosphor composite.

The fluoride phosphor composite may include a second shell coating the first shell and the second shell may be made of an organic material. The second shell may include an organic compound having at least one functional group among a carboxyl group (—COOH) and an amine group (—$NH_2$) and having 4 to 18 carbon atoms. The first shell may be made of an organic material, and the thickness of the first shell may be equal to or smaller than 0.1 μm.

The electronic device may further include a light emitting device configured to activate the fluoride phosphor composite. The electronic device may be a display or a light bulb.

BRIEF DESCRIPTION OF DRAWINGS

The above and other aspects, features and advantages of the present inventive concept will be more clearly understood from the following detailed description taken in conjunction with the accompanying drawings, in which.

DETAILED DESCRIPTION

Figure 1:
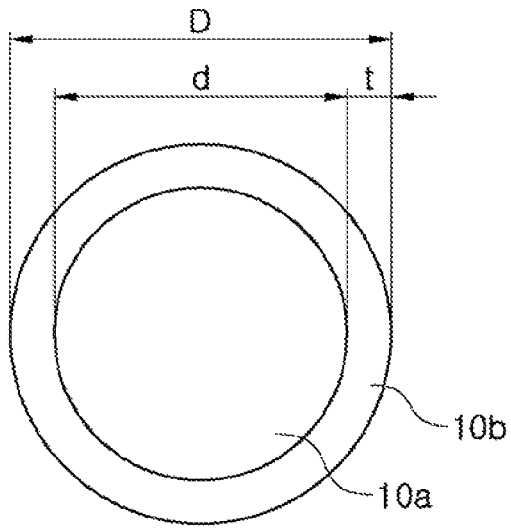
FIG. 1 is a view schematically illustrating a cross-section of a fluoride phosphor composite particle according to an exemplary embodiment of the present inventive concept.

Exemplary embodiments of the present inventive concept will now be described in detail with reference to the accompanying drawings.

The inventive concept may, however, be embodied in many different forms and should not be construed as being limited to the specific embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, the shapes and dimensions of elements may be exaggerated for clarity, and the same reference numerals will be used throughout to designate the same or like elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, an electronic device may refer to a device including an electronic component or an electronic function. An electronic device may also refer to semiconductor devices including light emitting diodes (LED), transistors, and other devices including a semiconductor material. An electronic device may additionally include products that include semiconductor devices, such as a memory module, memory card, hard drive including additional components, or a mobile phone, laptop, tablet, desktop, camera, display, lighting device (including light bulbs and LCD backlights) or other consumer electronic device, etc.

FIG. 1 is a view schematically illustrating a cross-section of a fluoride phosphor composite particle according to an exemplary embodiment of the present inventive concept.

A fluoride phosphor composite particle 10 illustrated in FIG. 1 includes a fluoride phosphor core (a "phosphor core" or a "core") 10a expressed as $A_xMF_y:Mn^{4+}$ (for example) and a fluoride coating (a "coating", a "fluoride shell" or a "shell") 10b encapsulating the fluoride phosphor core 10a. The fluoride coating may not contains manganese (Mn). A thickness t of the fluoride coating 10b may be less than or equal to 35% of an overall size D of the particle 10.

As used herein, throughout this disclosure, a particle size may be defined by its diameter when it is a spherical object. When a particle has irregular shape, the particle size may mean its volume based particle size if the context does not indicate otherwise. When particle size is with respect to a plurality of particles, the particle size may refer to the mass median diameter (d50) if the context does not indicate otherwise.

In the fluoride phosphor composite particle 10, the fluoride phosphor core 10a corresponding to the core is provided as a phosphor region performing wave conversion. The fluoride phosphor core 10a includes a fluoride expressed by the empirical formula $A_xMF_y:Mn^{4+}$ and the empirical formula may satisfy the following conditions.

1) A is at least one selected from among Li, Na, K, Rb, and Cs;

2) M is at least one selected from among Si, Ti, Zr, Hf, Ge, and Sn;

3) The composition ratio (x) of A is $2 \leq x \leq 3$; and

4) The composition ratio (y) of F is $4 \leq y \leq 7$.

The fluoride phosphor core 10a may be expressed by the empirical formula of $K_2SiF_6:Mn^{4+}$, $K_2TiF_6:Mn^{4+}$, $K_2SnF_6:Mn^{4+}$, $Na_2TiF_6:Mn^{4+}$, $Na_2ZrF_6:Mn^{4+}$, $K_3SiF_7:Mn^{4+}$, $K_3ZrF_7:Mn^{4+}$, or $K_3SiF_5:Mn^{4+}$. The fluoride phosphor core 10a may be excited by a wavelength ranging from an ultraviolet region to a blue region to provide a red light. For example, the fluoride phosphor core 10a may absorb excitation light having a peak wavelength ranging from 300 nm to 500 nm and emit light having a peak wavelength ranging from 620 nm to 640 nm.

$Mn^{4+}$ contained in the fluoride phosphor core 10a may be vulnerable to moisture, making it difficult to secure reliability in a high temperature, high humidity environment. In the present exemplary embodiment, the fluoride phosphor core 10a is encapsulated by a fluoride coating 10b not containing manganese (Mn), and the fluoride coating 10b may be provided as a protective film protecting the fluoride phosphor core 10a. For example, the fluoride coating 10b may effectively protect the fluoride phosphor core 10a from moisture.

The fluoride coating 10b corresponding to a shell may include a fluoride expressed by the empirical formula $A_xMF_y$. For example, the fluoride coating 10b may include $K_2TiF_6$, $K_2SnF_6$, $Na_2TiF_6$, $Na_2ZrF_6$, $K_3SiF_7$, $K_3ZrF_7$, or $K_3SiF_5$. In an exemplary embodiment, the fluoride forming the fluoride coating 10b may have the same composition as that of the fluoride phosphor core 10a, except that manganese (Mn) is not contained. For example, when the fluoride phosphor core 10a is $K_2SiF_6:Mn^{4+}$, the fluoride coating 10b may be $K_2SiF_6$.

In certain condition, the fluoride coating 10b may reduce the light emitting efficiencies of the fluoride phosphor core 10a and the fluoride phosphor composite particle 10. The fluoride coating 10b employed in the present embodiment may have a thickness less than or equal to 35% of the overall size D of the fluoride phosphor composite particle 10. By controlling the thickness t of the fluoride coating 10b, the light emitting efficiencies of the fluoride phosphor core 10a and the fluoride phosphor composite particle 10 may be enhanced or at least the reduction of the light emitting efficiencies may be relieved that might have occurred due to the fluoride coating 10b. In the present embodiment, external quantum efficiency of the fluoride phosphor composite particle 10 may increase to be greater than that of the fluoride phosphor core 10a, and even in the case that the external quantum efficiency of the fluoride phosphor composite particle 10 decreases, a decrement thereof may be maintained to be smaller than 25%, or even to be smaller than 10%. Also, due to the fluoride coating 10b, internal quantum efficiency of the fluoride phosphor composite particle 10 may be greater than that of the fluoride phosphor core 10a before the fluoride phosphor core 10a is coated with fluoride coating 10b. This may be a result of defect curing of the fluoride phosphor core 10a during a fluoride coating process. Due to the increase in the internal quantum efficiency, external quantum efficiency of the fluoride phosphor composite particle 10 may also increase to be greater than that of the fluoride phosphor core 10a before being coated, under a certain thickness condition of the fluoride coating 10b (please refer to FIGS. 7A and 7B).

The fluoride coating employed in the present embodiment may significantly enhance the reliability of the fluoride phosphor composite particle 10 in a high temperature and/or a high humidity environments. Fluoride phosphor composite particles 10 kept for 15 hours in an environment of a temperature of 85° C. and a relative humidity of 85% maintained external quantum efficiency to be equal to or greater than 80% of their initial external quantum efficiency when the fluoride phosphor composite particle 10 was excited with a light of 450 nm wavelength (please refer to FIG. 8A). In order to obtain acceptable reliability, the fluoride coating 10b may have a thickness equal to or greater than 1% of the size D of the fluoride phosphor composite particle 10.

In certain embodiments, the size d of the fluoride phosphor core 10a may range from 5 μm to 25 μm with respect to d50 (mass median diameter). In this case, the thickness t of the fluoride coating 10b not containing manganese (Mn) may range from 0.1 μm to 5 μm.

In this manner, the thickness t condition of the fluoride coating 10b proposed in the present embodiment may be realized as a relatively reduced thickness, and may be appropriately realized by a technique of controlling the thickness of the fluoride coating 10b with high reproducibility.

Figure 2:
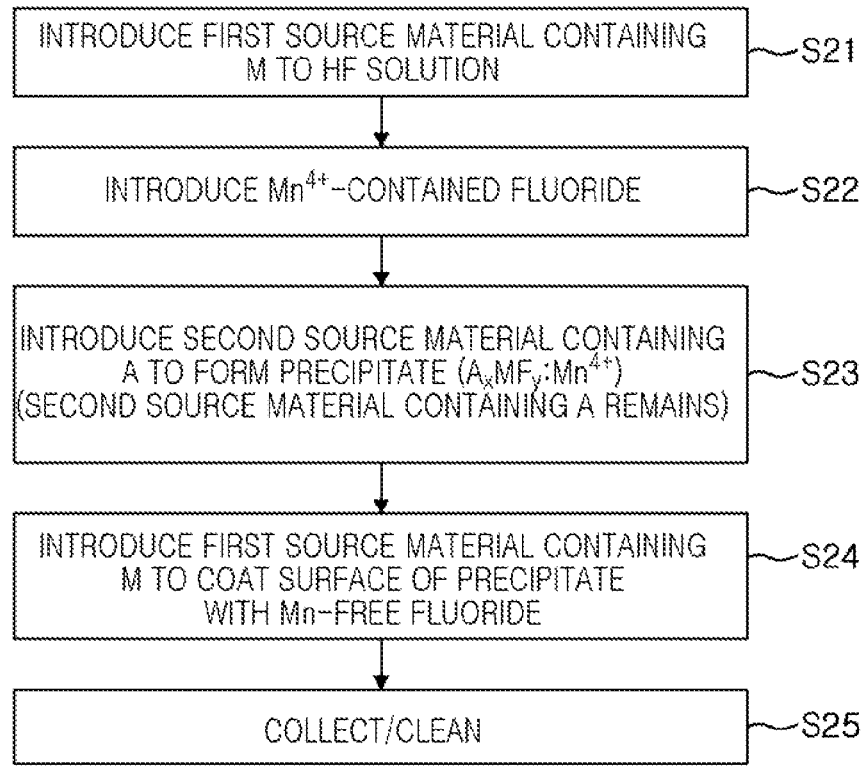
FIG. 2 is a flow chart illustrating a method for preparing a fluoride phosphor composite according to an exemplary embodiment of the present inventive concept.

FIG. 2 is a flow chart illustrating a method for preparing a fluoride phosphor composite according to an exemplary embodiment of the present inventive concept.

Referring to FIG. 2, first, operation S21 of introducing a first source material containing M into a hydrofluoric (HF) solution may be performed.

The first source material may be at least one among $H_xMF_y$, $A_xMF_y$, and $MO_2$. For example, the first source material may be $H_2SiF_6$ or $K_2SiF_6$. After the first source material is introduced into the HF solution, the solution may be stirred for a few minutes such that the first source material may be easily dissolved.

Next, in operation S22, a fluoride containing $Mn^{4+}$ may be introduced to the HF solution.

The $Mn^{4+}$-contained fluoride may be, for example, $K_2MnF_6$. Similar to the previous process, the fluoride containing $Mn^{4+}$ may be introduced to an HF solution with the first source material dissolved therein, which may, then, be stirred such that the fluoride containing $Mn^{4+}$ may be sufficiently dissolved.

In this embodiment, it is illustrated that the first source material containing M and the fluoride containing $Mn^{4+}$ are sequentially introduced to the HF solution, but alternatively, an HF solution may be prepared in different introduction order. For example, after the $Mn^{4+}$-contained fluoride is introduced to the HF solution, the first source material containing M may be introduced thereto.

Next, in operation S23, a second source material containing A may be introduced to the HF solution to make fluoride phosphor core particle precipitate expressed by the empirical formula $A_xMF_y$:$Mn^{4+}$.

The second source material may be $AHF_2$. For example, the second source material may be $KHF_2$. The second source material may be introduced into the HF solution in a saturated solution state or in a powder state. For example, the source material may be a saturated solution obtained by dissolving $KHF_2$ in an HF solution. As the concentration of each source material comes close to a limit of solubility, an orange precipitate may be formed. The precipitate may be $Mn^{4+}$-activated fluoride ($A_xMF_y$:$Mn^{4+}$). For example, when at least one of $H_2SiF_6$ and $K_2SiF_6$ and $KHF_2$ are used as the first and second source materials and $K_2MnF_6$ is used as the $Mn^{4+}$-contained compound, the precipitate may be a fluoride phosphor core particles expressed as $K_2SiF_6$:$Mn^{4+}$. In this process, the particle size of the fluoride phosphor cores may be controlled by adjusting the period of time during which the second source material is introduced and/or the number of times of introducing the second source material.

In the present embodiment, even after the synthesizing process is completed, the second source material containing A may remain. Meanwhile, the manganese ion ($Mn^{4+}$) within the HF solution may be almost exhausted during the synthesizing process. In order to allow the second source material to remain, the second source material may be over-input. An over-input amount (or a residual amount) of the second source material may be set in consideration of the input amount of other source materials and solubility of the HF solution.

Thereafter, in operation S24, the first source material is additionally applied to the HF solution in which the fluoride phosphor cores are formed, to coat the fluoride phosphor cores with fluoride not containing manganese.

Since the second source material remains in the previous synthesizing process, while the manganese ion $Mn^{4+}$ is almost exhausted, a fluoride containing A and M may be formed by the additionally input of the first source material, which does not include manganese. The non-manganese fluoride (or the manganese (Mn)-free fluoride) may coat the fluoride phosphor cores formed in the previous steps by precipitation. Through the coating process, fluoride phosphor composite particles 10 may be obtained. The fluoride phosphor composite particles are similar to the one illustrated in FIG. 1, and are coated with the Mn-free fluoride.

For example, $K_2SiF_6$:$Mn^{4+}$ may be synthesized first in the previous process. When a predetermined amount of $H_2SiF_6$ solution is additionally supplied to the HF solution, the $H_2SiF_6$ solution reacts with the residual $KHF_2$ to produce $K_2SiF_6$. The produced $K_2SiF_6$ may not contain manganese ion ($Mn^{4+}$), and may be coated as a shell on a surface of the $K_2SiF_6$:$Mn^{4+}$ fluoride core.

During this coating process, the thickness of the $Mn^{4+}$-free fluoride coating may be controlled by adjusting supply of the additionally introduced first source material such as $H_2SiF_6$. A desired appropriate thickness may be provided such that optical loss is minimized. This is a simplified process as the synthesizing process and the coating process are performed as one step within the single HF solution.

In the present embodiment, the residual material is the second source material after the synthesizing process S23 is completed. In certain embodiments, the first source material may remain after the fluoride phosphor cores are formed. In this case, the second source material containing A, rather than the first source material, may be additionally introduced to provide desired fluoride coating during the coating process (S24).

Thereafter, in operation S25, the fluoride phosphor composite coated with $Mn^{4+}$-free fluoride may be cleaned.

The cleaning process may be performed a plurality of times using different solutions. As cleaning solutions, an HF solution and/or an acetone solution may be used. First, after the fluoride phosphor composite is collected from the HF solution, a source material remaining on the fluoride phosphor composite may be removed. For example, the second source material (e.g., $KHF_2$) may remain on the surface of the fluoride phosphor composite particles due to an over-input of the second source material during the coating process. The residual second source material may be removed using the HF solution. Subsequently, the HF solution may be removed from the fluoride phosphor composite particles using acetone.

Figure 3:
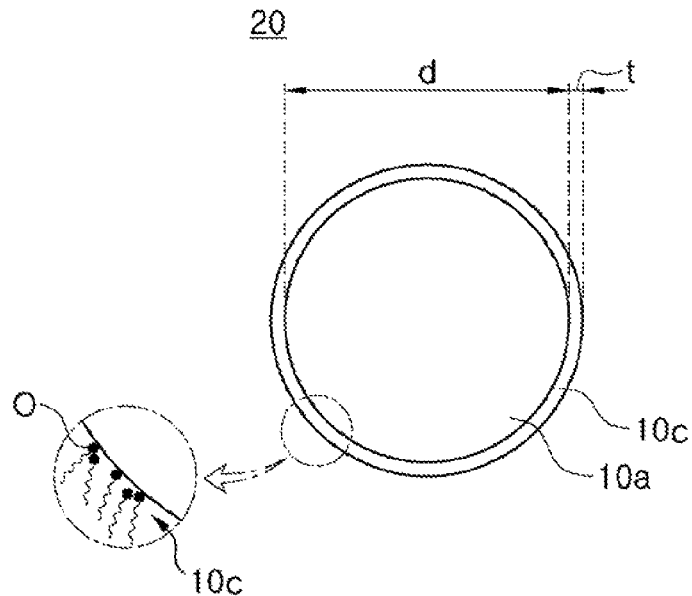
FIG. 3 is a view schematically illustrating a cross-section of a fluoride phosphor composite particle according to an exemplary embodiment of the present inventive concept.

FIG. 3 is a view schematically illustrating a cross-section of a fluoride phosphor composite particle 20 according to an exemplary embodiment. This exemplary embodiment relates to a fluoride phosphor composite particle having an organic coating.

A fluoride phosphor composite particle 20 illustrated in FIG. 3 includes a fluoride phosphor core (a "phosphor core" or a "core") 10a expressed as $A_xMF_y:Mn^{4+}$ and an organic coating (a "coating", an "organic shell" or a "shell") 10c encapsulating the fluoride phosphor core 10a.

The fluoride phosphor core 10a corresponding to the core of the fluoride phosphor composite particle 20 may include a fluoride phosphor expressed by the empirical formula $A_xMF_y:Mn_{4+}$ similarly to the fluoride phosphor composite particle 10 of the previous embodiment.

In the present exemplary embedment, in order to solve the vulnerability of the fluoride phosphor core 10a to moisture, the organic coating 10c is provided as a protective layer to the surface of the fluoride phosphor core 10a.

The organic coating 10c may include a hydrophobic organic material O physically adsorbed on the surface of the fluoride phosphor core 10a. The organic coating 10c may include an organic compound having at least one functional group among a carboxyl group (—COOH) and an amine group (—$NH_2$) and having 4 to 18 carbon atoms. The organic coating 10c is formed of an organic compound having light transmittance and formed as a thin film having a thin thickness t (e.g., less than or equal to 0.1 μm).

Due to the organic coating 10c, the fluoride phosphor composite particle 20 may have high reliability even in a high temperature and/or a high humidity environments. For example, after the fluoride phosphor composite particle 20 was kept in an environment of a temperature of 85° C. and a relative humidity of 85% for 3 hours, the external quantum efficiency of the fluoride phosphor composite particle 20 may be equal to or greater than 130% of the external quantum efficiency of the fluoride phosphor core 10a under the same conditions with a light of a wavelength of 450 nm (please refer to FIG. 11A).

Figure 4:
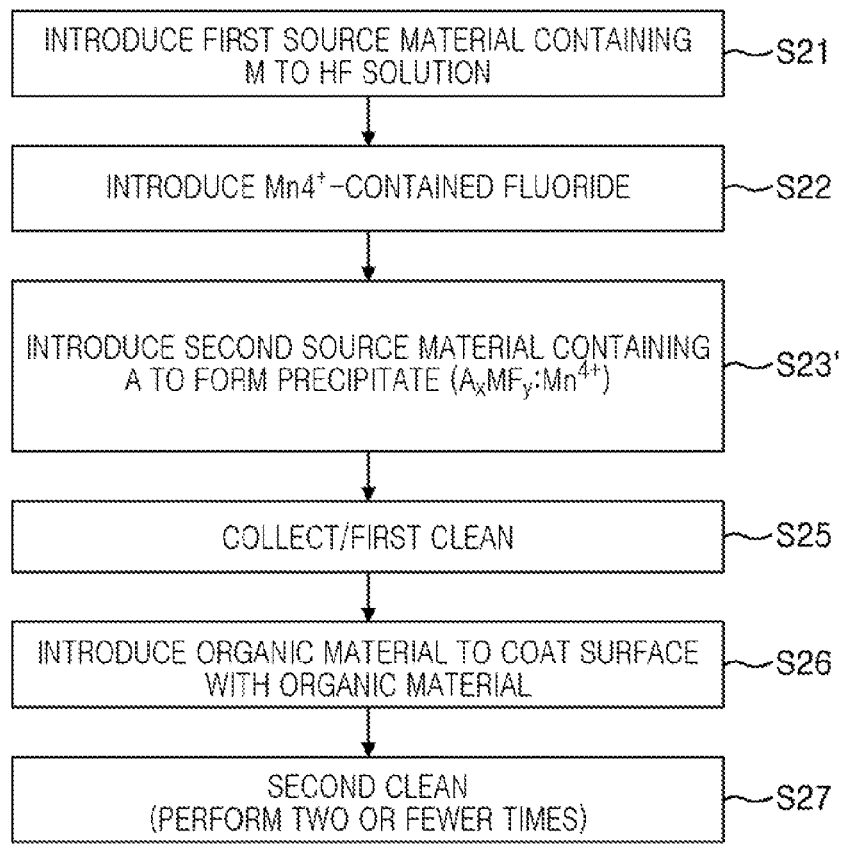
FIG. 4 is a flow chart illustrating a method for preparing a fluoride phosphor composite according to an exemplary embodiment of the present inventive concept.

FIG. 4 is a flow chart illustrating a method for preparing a fluoride phosphor composite according to an exemplary embodiment of the present inventive concept. Unless otherwise indicated, each step in FIG. 4 may be understood with reference to the descriptions regarding the steps denoted with the same or similar reference letters in FIG. 2.

Referring to FIG. 4, first, operation S21 of introducing a first source material containing M into a hydrofluoric (HF) solution may be performed. The first source material may be at least one among $H_xMF_y$, $A_xMF_y$, and $MO_2$. For example, the first source material may be $H_2SiF_6$ or $K_2SiF_6$.

Next, in operation S22, a fluoride containing $Mn^{4+}$ may be introduced to the HF solution. The fluoride containing $Mn^4$ may be, for example, $K_2MnF_6$. As described in the previous exemplary embodiment, the HF solution in which the first source material and the $Mn^{4+}$-contained fluoride are mixed may be prepared in different introduction orders.

Next, in operation S23', a second source material containing A may be introduced to the HF solution to make fluoride phosphor core particle precipitate expressed by the empirical formula $A_xMF_y:Mn^{4+}$.

The second source material may be $AHF_2$. For example, the second source material may be $KHF_2$. The source material may be introduced in a saturated solution state or in a powder state. For example, the source material may be a saturated solution obtained by dissolving $KHF_2$ in an HF solution, and in this process, $Mn^{4+}$-activated fluoride ($A_xMF_y:Mn^{4+}$) particles may precipitate.

Subsequently, in operation S25, the $Mn^{4+}$-activated fluoride ($A_xMF_y:Mn^{4+}$) particles may be cleaned. This cleaning process may be performed a plurality of times using different cleaning solutions. As the cleaning solutions, an HF solution and/or an acetone solution may be used.

Thereafter, in operation S26, the fluoride phosphor cores and an organic material are introduced into a solvent to coat the fluoride phosphor cores with the organic material.

The solvent may be selected from a material which does not damage the fluoride phosphor cores and does disperse the organic material sufficiently. For example, the solvent may be acetone. The organic material may include a hydrophobic organic material that may be physically adsorbed on the surfaces of the fluoride phosphor cores. The organic material may include an organic compound having at least one functional group among a carboxyl group (—COOH) and an amine group (—$NH_2$) and having 4 to 18 carbon atoms. For example, the organic material may be acrylate having at least one functional group among the carboxyl group (—COOH) and the amine group (—$NH_2$).

In certain embodiments, the phosphor particles and the organic material may be evenly dispersed in acetone. Subsequently, an excessive amount of organic material, together with the phosphor particles, may be added to the acetone solvent to coat the surface of the phosphor particles ($K_2SiF_6$:$Mn^{4+}$) with the organic material. The initially introduced hydrophobic organic material may cover the phosphor particles such that it is physically adsorbed thereto, and due to the organic material present on the surface of the phosphor particles, moisture permeation may be reduced. Alternatively, the organic coating process may be directly applied following the synthesizing process S23' without or before the cleaning process S25.

Thereafter, in operation S27, the fluoride phosphor composite particles 20 coated with the organic material may be cleaned for a second time. During this cleaning process, a residue of organic material formed on the fluoride phosphor composite particles 20 due to the excessive introduction of the organic material may be removed from the fluoride phosphor composite particles 20. Acetone may be used as a cleaning solvent. During the previous coating process, the cleaning processes may be necessary because the excessive amount of organic material is introduced. However, if the fluoride phosphor composite particles 20 are excessively cleaned, the organic coating on the surface may be damaged. Thus, the cleaning processes following the organic coating process may be limited to two or fewer times (please refer to FIG. 12).

Figure 5:
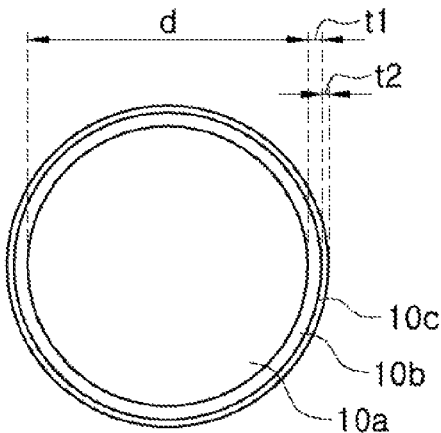
FIG. 5 is a view schematically illustrating a cross-section of a fluoride phosphor composite particle according to an exemplary embodiment of the present inventive concept.

In certain embodiments, a fluoride phosphor composite particle may be manufactured by applying an inorganic coating or an organic coating. For example, the embodiment described with regard to FIG. 2 is an inorganic coating method, and the embodiment described with regard to FIG. 4 is an organic coating method. In some embodiments, both an inorganic coating (Mn-free fluoride) and an organic coating methods may be applied on a single particle. FIG. 5 is a schematic view illustrating a cross-section of a fluoride phosphor composite particle 30 on which both inorganic coating and organic coating are performed.

The fluoride phosphor composite particle 30 illustrated in FIG. 5 includes a fluoride phosphor core (a "phosphor core" or a "core") 10a expressed as $A_xMF_y:Mn^{4+}$, an Mn-free fluoride coating (or a "first shell") 10b encapsulating the fluoride phosphor core 10a, and an organic coating (or a "second shell") 10c formed on a surface of the fluoride coating 10b.

The fluoride phosphor core 10a corresponding to the core of the fluoride phosphor composite particle 30 may include a fluoride phosphor expressed by the empirical formula AxMFy:Mn4+ similarly to the fluoride phosphor composite particles 10 and 20 of the previous embodiments. In the present embodiment, the structure for protecting the fluoride phosphor core 10a may be provided as a dual-shell structure including the fluoride coating 10b and the organic coating 10c. The fluoride coating 10b and the organic coating 10c employed in the present embodiment may be understood with reference to the configuration illustrated in FIG. 1 unless otherwise mentioned.

The fluoride coating 10b corresponding to the first shell may be directly provided on the surface of the fluoride core 10a. The fluoride coating 10b may include a fluoride expressed by the empirical formula $A_xMF_y$. For example, the fluoride coating 10b may include $K_2TiF_6$, $K_2SnF_6$, $Na_2TiF_6$, $Na_2ZrF_6$, $K_3SiF_7$, $K_3ZrF_7$, or $K_3SiF_5$. For example, in a case in which the fluoride core 10a is $K_2SiF_6:Mn^{4+}$, the fluoride coating 10b may be $K_2SiF_6$.

The organic coating 10c may include a hydrophobic organic material O physically adsorbed on a surface of the fluoride phosphor core 10a. The organic coating 10c may include an organic compound having at least one functional group among a carboxyl group (—COOH) and an amine group (—NH$_2$) and having 4 to 18 carbon atoms. The organic coating 10c is formed of an organic compound having light transmittance and formed as a thin film having a relatively reduced thickness (e.g., less than or equal to 0.1 μm).

The organic coating 10c corresponding to the second shell may be formed of a hydrophobic organic material physically adsorbed on a surface of the fluoride coating 10b. The organic coating 10c may include an organic compound having at least one functional group among the carboxyl group (—COOH) and the amine group (—NH$_2$) and having 4 to 18 carbon atoms. For example, the organic coating 10c may be acrylate having at least one functional group among the carboxyl group (—COOH) and the amine group (—NH$_2$).

Figure 6:
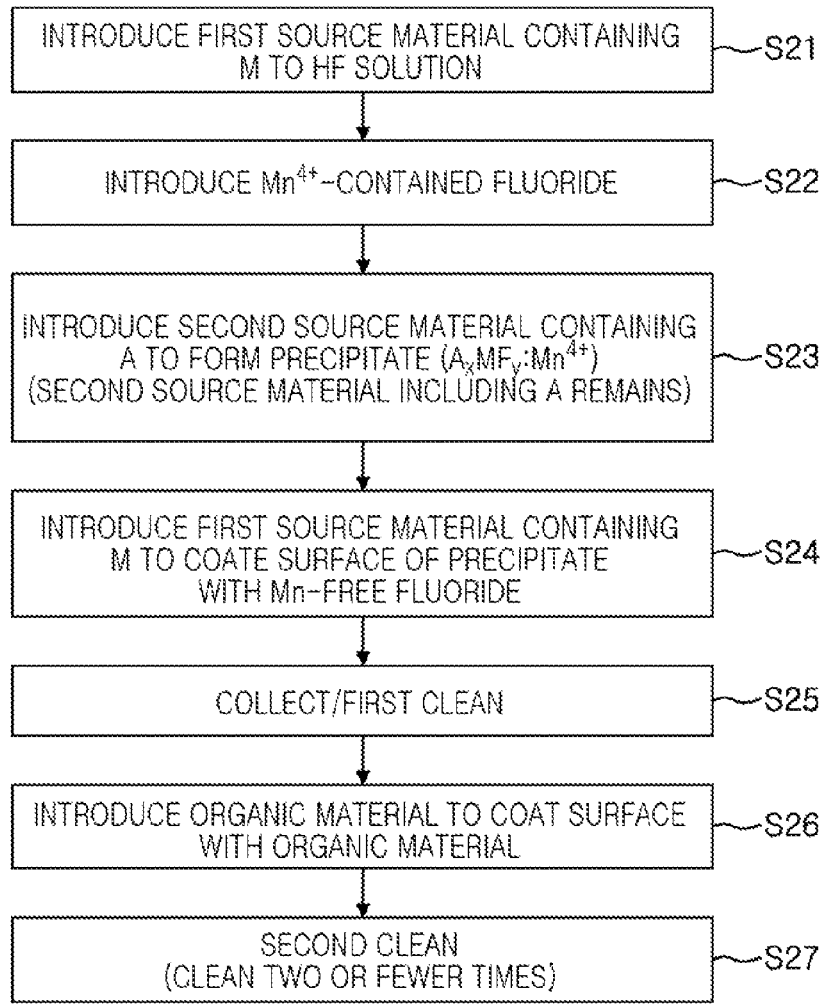
FIG. 6 is a flow chart illustrating a method for preparing a fluoride phosphor composite according to an exemplary embodiment of the present inventive concept.

Since the dual-shell structure having the organic coating 10c together with the fluoride coating 10b is employed, there may be a synergistic effect of improving reliability of the fluoride phosphor composite particles 30 including $Mn^{4+}$-activated fluoride phosphor cores. The dual-shell structure may be realized through a manufacturing process illustrated in FIG. 6. FIG. 6 is a flow chart illustrating a method for preparing a fluoride phosphor composite particle 30 according to an embodiment of the present inventive concept, specifically, a method for forming a dual-shell structure.

Referring to FIG. 6, a first source material containing M to an HF solution may be introduced in operation S21. The first source material may be at least one among $H_xMF_y$, $A_xMF_y$, and $MO_2$. For example, the first source material may be $H_2SiF_6$ or $K_2SiF_6$.

Next, in operation S22, a fluoride containing $Mn^{4+}$ may be introduced to the HF solution. The $Mn^{4+}$-contained fluoride may be $K_2MnF_6$.

Thereafter, in operation S23, a second source material containing A may be introduced to the HF solution to make fluoride phosphor core precipitate expressed by the empirical formula $A_xMF_y:Mn^{4+}$. The second source material may be $AHF_2$. For example, the second source material may be $KHF_2$. For example, the second source material may be introduced in a saturated solution state or in a powder state. For example, the source material may be a saturated solution obtained by dissolving $KHF_2$ in an HF solution, and during this process, the $Mn^{4+}$-activated fluoride ($A_xMF_y:Mn^{4+}$) particles may precipitate. After the synthesizing process is completed, the second source material containing A may remain while the manganese ion ($Mn^{4+}$) within the HF solution may be almost exhausted during the synthesizing process.

Subsequently, in operation S24, the first source material is additionally introduced to the HF solution in which the fluoride phosphor cores are formed, in order to coat the fluoride phosphor cores with the Mn-free fluoride. The first source material additionally introduced to the manganese-exhausted HF solution may create a fluoride containing A and M without manganese. Through this process, the Mn-free fluoride may coat the surface of the precipitated fluoride phosphor cores.

Thereafter, in operation S25, the $Mn^{4+}$-activated fluoride phosphor cores may be cleaned. The cleaning process may be performed a plurality of times using different solutions. As the cleaning solutions, an HF solution and/or an acetone solution may be used. If necessary, the cleaning process may be omitted.

Subsequently, in operation S26, the fluoride phosphor cores and an organic material are introduced into the solvent to coat the surface of the fluoride coating 10b with the organic material. In this embodiment, the organic coating 10c may be formed on the fluoride coating 10b to form a dual-shell structure with the fluoride coating 10b. The solvent may be acetone. The organic material may include a hydrophobic organic material that may be physically adsorbed on the surfaces of the fluoride phosphor cores.

Thereafter, in operation S27, the fluoride phosphor composite coated with organic material may be cleaned for a second time. The cleaning process following the organic coating 10c process may be limited to two or fewer times (please refer to FIG. 14B) in order to prevent damage to the organic coating 10c.

Hereinafter, operations and effects according to the present disclosure will be described in detail through specific exemplary embodiments.

EXPERIMENT 1A

Manganese ($Mn^{4+}$)-free Fluoride Coating

In this experiment, $H_2SiF_6$ was introduced to an HF solution and stirred for five minutes so as to be dissolved. Thereafter, $K_2MnF_6$ was introduced and stirred so as to be similarly ionized. An HF solution in which the two source materials were dissolved was prepared. A $KHF_2$ solution (prepared by dissolving $KHF_2$ in another HF solution) was introduced to the HF solution to allow a $K_2SiF_6$:$Mn^{4+}$ phosphor to be precipitated. In this case, an input amount of each of the source materials was determined such that a predetermined amount of $KHF_2$ was left in the HF solution after the phosphor was synthesized.

Subsequently, a fluoride coating process was performed in the $K_2SiF_6$:$Mn^{4+}$ phosphor-synthesized HF solution. That is, after the $K_2SiF_6$:$Mn^{4+}$ phosphor was synthesized, a predetermined amount of $H_2SiF_6$ solution was additionally supplied to the HF solution, and the $H_2SiF_6$ reacted with residual $KHF_2$ to create $K_2SiF_6$. The $K_2SiF_6$ formed during the additional synthesizing process was coated in the form of a shell on the surface of the $K_2SiF_6$:$Mn^{4+}$ phosphor. In this case, the thickness of the $Mn^{4+}$-free fluoride coating was controlled by adjusting the additional supply amount of the $H_2SiF_6$ solution.

For 30 g of $K_2SiF_6$:$Mn^{4+}$ phosphor, three different additional amounts of the $H_2SiF_6$ solutions, 13 mmol, 39 mmol, and 65 mmol were supplied. The particle size (d50) of the $K_2SiF_6$:$Mn^{4+}$ phosphor collected without additional supply of $H_2SiF_6$ solution and the particle sizes (d50) of phosphors with additional supply of $H_2SiF_6$ solution were measured as shown in Table 1. Here, the thickness of the fluoride coating was calculated as being a half of the thickness increment according to the additional supply of $H_2SiF_6$ solution.

TABLE 1

| Classification | Comparative Example A | Embodiment A1 | Embodiment A2 | Embodiment A3 |
|---|---|---|---|---|
| Additional supply amount | 0 | 13 | 39 | 65 |
| Particle size (d50) | 16 μm | 17 μm | 18.4 μm | 19.5 μm |
| Thickness of fluoride coating | 0 | 0.5 μm | 1.2 μm | 1.8 μm |

Figure 7A:
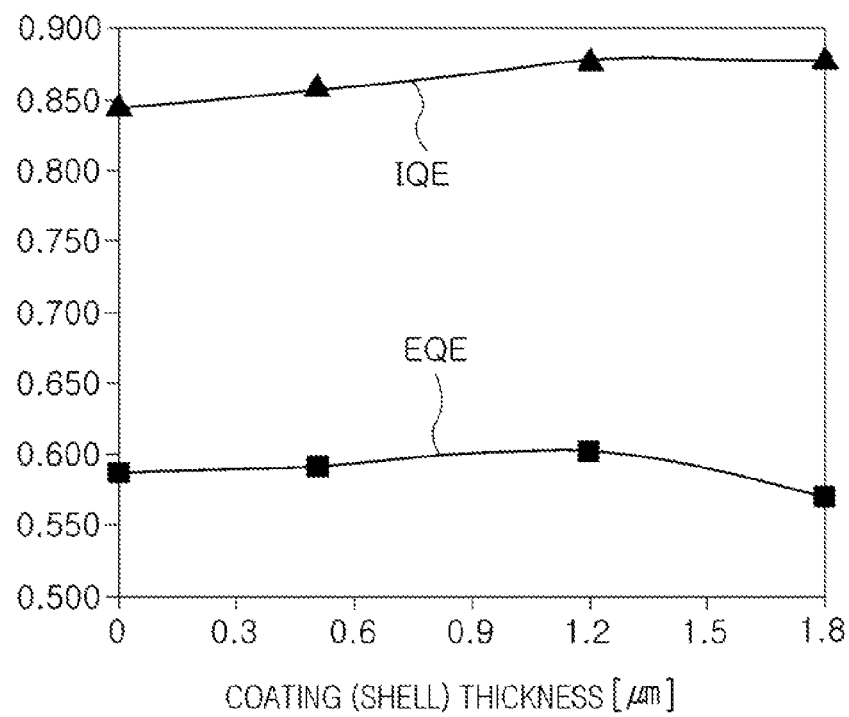
FIGS. 7A and 7B are graphs illustrating changes in internal quantum efficiency and external quantum efficiency over thickness of a fluoride coating not containing manganese (Mn)

External quantum efficiency and internal quantum efficiency of the phosphors listed in Table 1 were measured and results thereof are illustrated in FIG. 7A together with Table 2.

TABLE 2

| Classification | Comparative Example A | Embodiment A1 | Embodiment A2 | Embodiment A3 |
|---|---|---|---|---|
| Internal quantum efficiency (IQE) | 0.847 | 0.857 | 0.876 | 0.878 |

TABLE 2-continued

| Classification | Comparative Example A | Embodiment A1 | Embodiment A2 | Embodiment A3 |
|---|---|---|---|---|
| External quantum efficiency (EQE) | 0.588 | 0.593 | 0.602 | 0.571 |

Referring to FIG. 7A together with Table 2, it can be seen that internal quantum efficiency increased according to thicknesses of the fluoride coating. This may be understood that defects, for example, gaps, cracks, breaks, may be cured during the coating process because the fluoride coating material is structurally and characteristically the same as or similar to the fluoride core material. On the other hand, external quantum efficiency increased in Embodiment A1 and Embodiment A2 (1.2 μm) and slightly decreased in Embodiment A3 (1.8 μm). Thus, it shows that, when the thickness of the fluoride coating is 1.8 μm or more, external quantum efficiency may be reduced. This may be caused because the fluoride coating may absorb a part of the incident light. However, in spite of the reduction in external quantum efficiency, reliability improvement effect may be large enough for the thick fluoride coating to be advantageously used. Therefore, a fluoride coating having a thickness greater than that (1.8 μm) of Embodiment A3 may be employed in an actual usage environment.

In order to test stability of the fluoride phosphor composite powders according to the four samples (Comparative Example A and Embodiments A1 to A3) under high temperature, high humidity conditions, the fluoride phosphor composite powders of the four samples were kept in a chamber at a temperature of 85° C. with humidity of 85% for 15 hours and 250 hours respectively, and thereafter, variations in EQE and IQE of the fluoride phosphor composite powders of the four samples were measured when excited by light having a wavelength of 450 nm. The results are illustrated in FIGS. 8A and 8B.

Figure 8A:
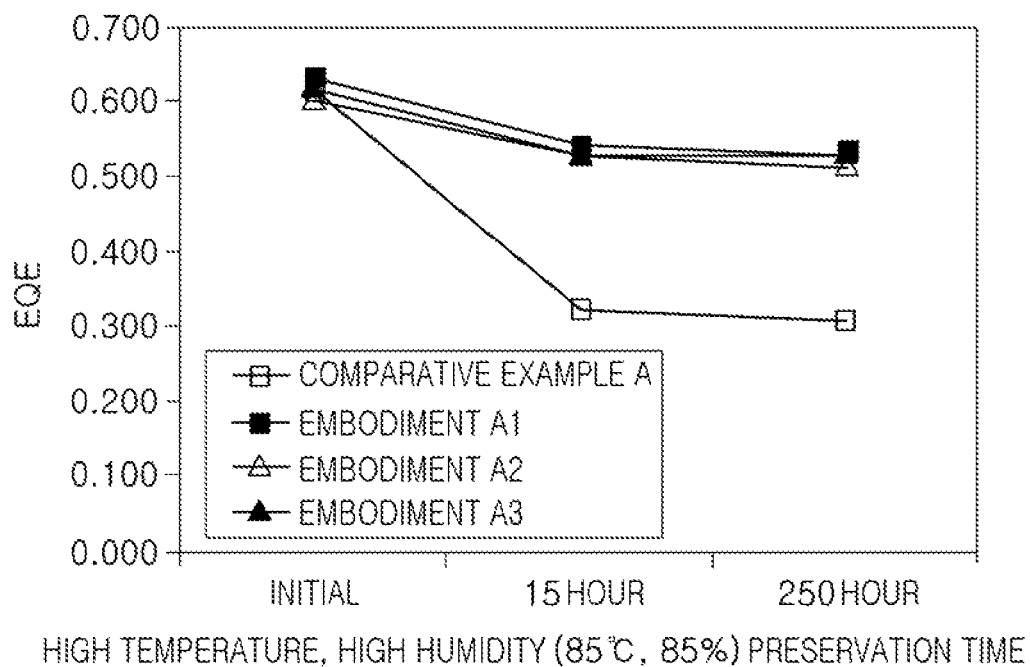
FIGS. 8A and 8B are graphs illustrating results (external quantum efficiency and internal quantum efficiency) of reliability evaluation of fluoride phosphor composites according to some embodiments (fluoride coating) of the present inventive concept.
Figure 8B:
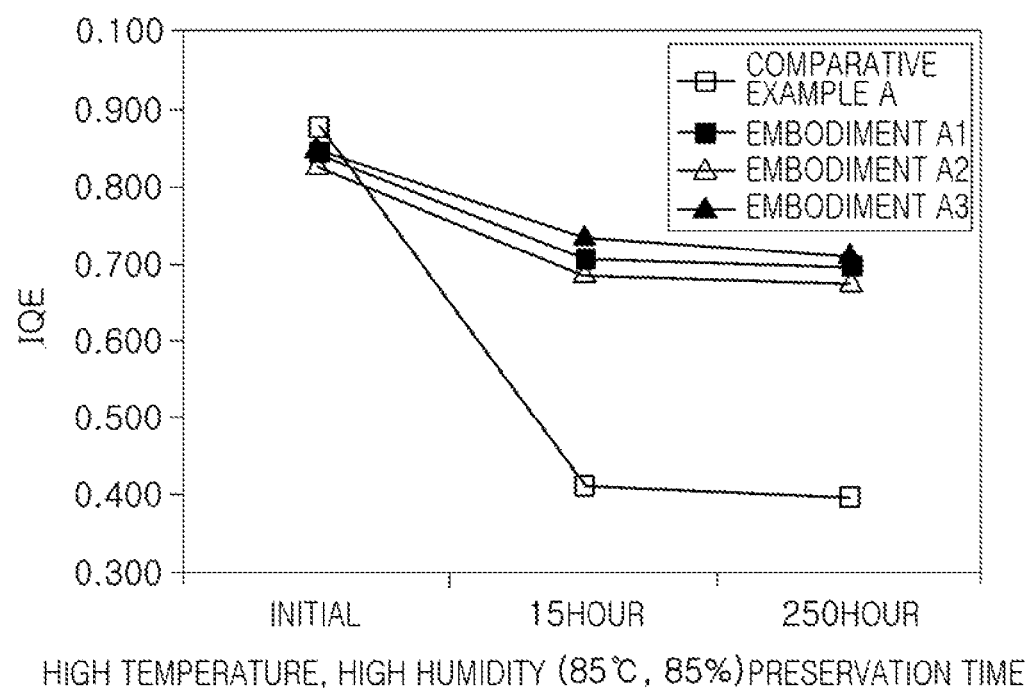

Referring to FIGS. 8A and 8B, it shows that external quantum efficiency was maintained at 51% to 53% and internal quantum efficiency was maintained at a level about 70% under high temperature, high humidity conditions (85° C. and 85%), excluding Comparative Example 1A (31% and 40%). In this manner, it was confirmed that the fluoride phosphor composite to which $Mn^{4+}$-free fluoride coating was applied has strengthened durability with respect to moisture.

External quantum efficiencies (EQE) of initial, after preservation test (85° C., 85%), and the variation rate thereof are illustrated in Table 3.

TABLE 3

| Classification | Comparative Example A | Embodiment A1 | Embodiment A2 | Embodiment A3 |
|---|---|---|---|---|
| Initial EQE (%) | 59% | 59% | 60% | 57% |
| 15 h EQE (%) | 32% | 54% | 53% | 54% |
| Variation rate (%) | −45% | −8% | −12% | −5% |

As illustrated in Table 3, in the case of Comparative Example A, the EQE after 15-hour preservation test was reduced about 45% from that of the initial EQE, while EQEs of Embodiments A1 to A3 had a reduction merely ranging from about 5% to 12%. Thus, it may be confirmed that, when the fluoride coating was employed, EQE after the 15-hour preservation test (85° C., 85%) was maintained at a level of 80% or above of its initial EQE.

EXPERIMENT 1B

Difference in Effect According to Ratio of Thickness of Fluoride Coating to Overall Particle In Experiment 1B, fluoride phosphor composites having fluoride phosphor cores $K_2SiF_6:Mn^{4+}$ coated with $K_2SiF_6$ fluoride under the same conditions as those of Experiment 1A were prepared, and here, in order to precisely check thickness conditions of the fluoride coating, thicknesses of the $K_2SiF_6$ fluoride coating was gradually increased from 0.1 μm to 6.0 μm to prepare fluoride phosphor composite particles (Sample B1 to B11) having the same overall size. That is, the sizes (d) of the fluoride phosphor cores ($K_2SiF_6$:$Mn^{4+}$) were reduced according to the increase in the thickness of the fluoride coating ($K_2SiF_6$) so that the overall sizes of the fluoride phosphor composite particles ($K_2SiF_6$:$Mn^{4+}$ core plus $K_2SiF_6$ shell) remain at about 15 μm. Table 4 shows the phosphor core sizes ($K_2SiF_6$:$Mn^{4+}$), thicknesses of the fluoride coatings ($K_2SiF_6$), and rates of the thicknesses of the fluoride coatings to the overall sizes of the fluoride phosphor composite particles of the samples.

TABLE 4

| | Classification | | | | | | | | | | |
|---|---|---|---|---|---|---|---|---|---|---|---|
| | B1 | B2 | B3 | B4 | B5 | B6 | B7 | B8 | B9 | B10 | B11 |
| Diameter of fluoride phosphor core (μm) | 14.8 | 14.6 | 14.4 | 14.0 | 13.0 | 12.0 | 11.0 | 9.0 | 7.0 | 5.0 | 3.0 |
| Thickness of coating (shell) (μm) | 0.1 | 0.2 | 0.3 | 0.5 | 1.0 | 1.5 | 2.0 | 3.0 | 4.0 | 5.0 | 6.0 |
| Thickness rate (%) | 0.67 | 1.33 | 2.00 | 3.33 | 6.67 | 10.00 | 13.33 | 20.00 | 26.67 | 33.33 | 40.00 |

Figure 7B:
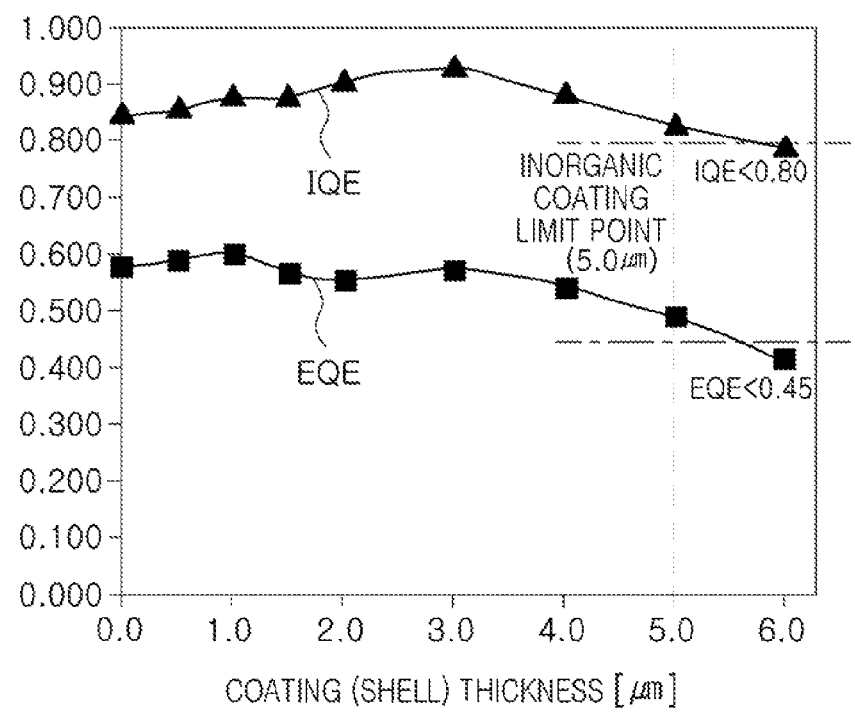

Table 5 shows IQE and EQE of the non-coated fluoride phosphor (corresponding to fluoride phosphor core) (sample B0) and some other samples having a size of 15 μm, which were measured with excitation light of 450 nm, and FIG. 7B shows graphs thereof. Table 5 also shows the intensification factor of EQE of each sample, which is compared with the EQE of sample B0.

TABLE 5

| Classification | Thickness of shell (μm) | Rate of shell thickness | IQE | EQE | Intensification factor (%) |
|---|---|---|---|---|---|
| B0 | 0.0 | 0 | 0.847 | 0.588 | — |
| B4 | 0.5 | 3.33% | 0.857 | 0.593 | 0.85 |
| B5 | 1.0 | 6.67% | 0.876 | 0.602 | 1.53 |
| B6 | 1.5 | 10.00% | 0.878 | 0.571 | −5.27 |
| B7 | 2.0 | 13.33% | 0.905 | 0.558 | −2.21 |
| B8 | 3.0 | 20.00% | 0.926 | 0.576 | −3.06 |
| B9 | 4.0 | 26.67% | 0.880 | 0.547 | −4.93 |
| B10 | 5.0 | 33.33% | 0.827 | 0.493 | −9.18 |
| B11 | 6.0 | 40.00% | 0.790 | 0.420 | −12.41 |

Referring to FIG. 7B together with Table 5, IQE tended to decrease from sample B8 through sample B11, and EQE tended to continuously decrease from sample B8 through sample B11. The decrement of EQE was much bigger between sample B10 and B11 than those of the others. In consideration of an improvement effect on reliability, it is preferred to secure 80% or more of IQE and 45% or more of EQE. As for sample B11, the EQE decrement from the EQE of B0 exceeds 10%. (The intensification factor is −12.41%.) It may be preferred for the intensification factor to be −10% or better so that the appropriate ratio of thickness (t) of the fluoride coating (or shell) to the overall particle size (D) is 35% or less. It also shows that quantum efficiency improvement effect is higher when the thickness of the fluoride coating is less than or equal to 20% of the overall particle size D as it shows that IQE is continuously increasing from sample B0 through sample B8.

On the other hand, in order to obtain a sufficient effect of fluoride coating, it may be preferred that the fluoride coating may be formed to have a thickness equal to or greater than 1% of the size D of the overall particle (for example, a fluoride phosphor composite).

EXPERIMENT 1C

Evaluation of Reliability in White Light Emitting Device

In this experiment, white light emitting devices were manufactured using the $K_2SiF_6:Mn^{4+}$ fluoride phosphor and phosphor composites (Comparative Example A and Embodiments A1 to A3) obtained in Experiment 1A as a red phosphor. A blue LED chip had a dominant wavelength of 450 nm and β-SiAlON was used as a green phosphor.

In addition, $K_2SiF_6:Mn^{4+}$ fluoride phosphor composites in which thicknesses of $K_2SiF_6$ coatings were 2.0 μm and 3.0 μm (Embodiments A4 and A5) were prepared under the same conditions as those of Experiment 1A and a white light emitting device was manufacturing in the same manner.

A driving test under high temperature, high humidity conditions was performed on each white light emitting device in a chamber having a temperature of 85° C. and relative humidity of 85% under driving conditions in which a current of 150 mA flowed for a total of 500 hours, and luminance and color coordinates were measured in 40 hours, 100 hours, 250 hours, and 500 hours. Luminance measurement results are shown as relative reference values (%) in Table 6 and as a graph in FIG. 9, and color coordinates measurement results are also shown as variation rates compared with initial coordinates in Table 7 and as a graph in FIG. 10.

TABLE 6

| Luminance | 0 | 4 h | 100 h | 250 h | 500 h |
|---|---|---|---|---|---|
| Comparative Example A | 100.0% | 96.8% | 95.0% | 92.8% | 90.3% |
| Embodiment A1 | 100.0% | 97.9% | 97.1% | 95.1% | 92.9% |
| Embodiment A2 | 100.0% | 98.8% | 98.2% | 96.3% | 94.4% |
| Embodiment A3 | 100.0% | 99.9% | 99.7% | 98.1% | 96.0% |
| Embodiment A4 | 100.0% | 99.8% | 98.7% | 97.7% | 96.2% |
| Embodiment A5 | 100.0% | 100.0% | 99.4% | 98.7% | 98.1% |

TABLE 7

| Luminance | 0 | 4 h | 100 h | 250 h | 500 h |
|---|---|---|---|---|---|
| Comparative Example A | 0 | −0.0062 | −0.0102 | −0.0117 | −0.0137 |
| Embodiment A1 | 0 | −0.0034 | −0.0049 | −0.0074 | −0.0097 |
| Embodiment A2 | 0 | −0.0029 | −0.0051 | −0.0065 | −0.0082 |
| Embodiment A3 | 0 | −0.0027 | −0.0032 | −0.0057 | −0.0070 |
| Embodiment A4 | 0 | −0.0015 | −0.0027 | 0.0030 | −0.0035 |
| Embodiment A5 | 0 | −0.0017 | −0.0019 | −0.0026 | −0.0028 |

Figure 9:
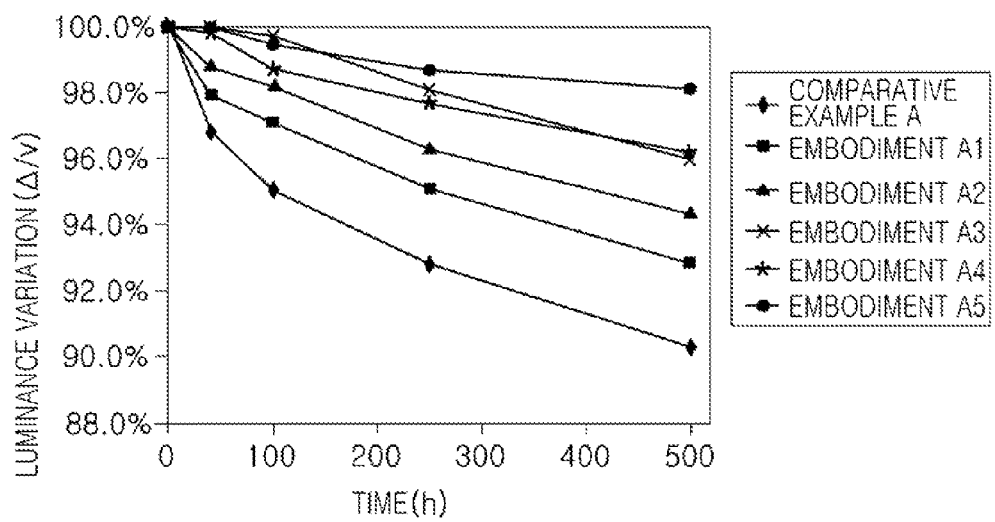
FIG. 9 is a graph illustrating results (changes in luminance) of reliability evaluation of white light emitting apparatuses employing fluoride phosphor composites according to some embodiments (fluoride coating) of the present inventive concept.
Figure 10:
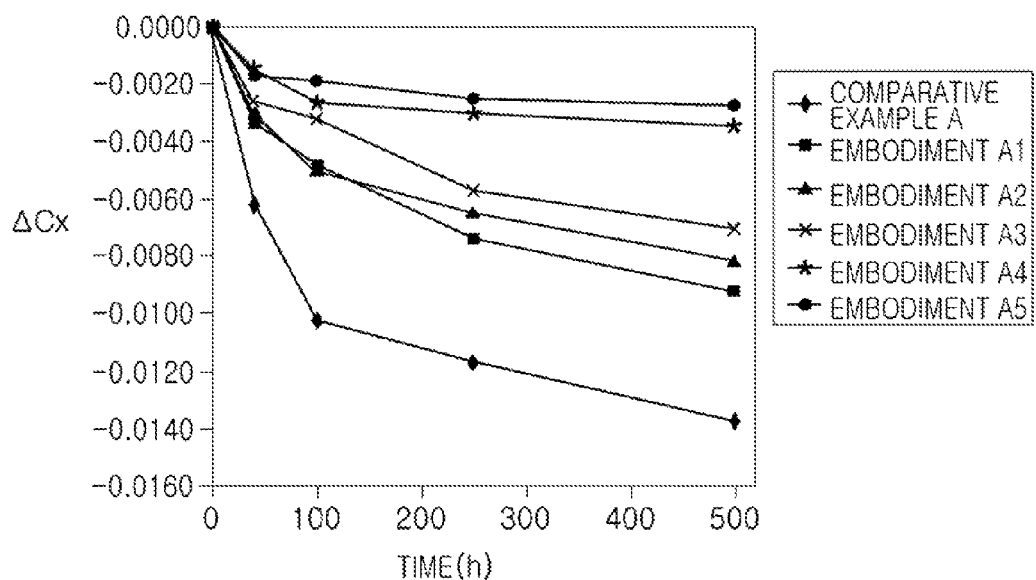
FIG. 10 is a graph illustrating results (changes in color coordinates) of reliability evaluation of white light emitting apparatuses employing fluoride phosphor composites according to some embodiments (fluoride coating) of the present inventive concept.

In Table 6 and FIG. 9, the results show that, as the thicknesses of the Mn-free fluoride coatings increased, luminance of the white light emitting devices employing the corresponding phosphors increased to 90.3% (Comparative Example A)→92.9% (Embodiment A1)→94.4% (Embodiment A2)→96.0% (Embodiment A3)→96.2% (Embodiment A4)→98.1% (Embodiment A5). Also, it shows that variation values ($^\Delta Cx$) of color coordinates (Cx) decreased to −0.0137 (Comparative Example A)→−0.0097 (Embodiment A1)→0.0082% (Embodiment A2)→0.0070 (Embodiment A3)→0.0035 (Embodiment A4)→0.0028 (Embodiment A5). As the thicknesses of the Mn-free fluoride coatings increased, durability against to moisture of the white light emitting device (package) employing the fluoride phosphor composite ($K_2SiF_6:Mn^{4+}$; $K_2SiF_6$) significantly increased.

EXPERIMENT 2A

Organic Coating

In this experiment, $K_2SiF_6:Mn^{4+}$ phosphor (d50=16 μm) was prepared under the same conditions as those of Experiment 1A. $K_2SiF_6:Mn^{4+}$ phosphor was collected from an HF solution used for a synthesis reaction, and the collected $K_2SiF_6:Mn^{4+}$ phosphor was cleaned with a hydrofluoric acid and acetone sequentially. Subsequently, in order to coat the $K_2SiF_6:Mn^{4+}$ phosphor core with an organic material, the fluoride phosphor core and the organic material were evenly dispersed in the acetone solvent and the organic material was adsorbed on the surface of the fluoride phosphor core particles to form a coating. Here, as for a solvent for organic coating, 43 ml, 64 ml, 85 ml, 128 ml, and 170 ml of organic materials were supplied to 500 ml of solvent with respect to 30 g of the $K_2SiF_6:Mn^{4+}$ phosphor to prepare different phosphor composites. That is, by differentiating ratios of the fluoride phosphor core material to the organic material as 1:1, 1:1.5, 1:2, 1:3, and 1:4 with respect to a mole ratio of the fluoride phosphor core material to the organic material, fluoride phosphor composites (Embodiments B1 to B5) having organic coatings were prepared.

In order to determine an influence of the mole ratio of the phosphor and the organic materials, EQE and IQE of the fluoride phosphor composites coated with the organic material were measured by using excitation light having a wavelength of 450 nm. Table 8 shows the measurement results. Here, Comparative Example B is a fluoride phosphor (corresponding to fluoride phosphor core) prepared according to the preparation method under the same conditions, except that organic coating was not applied.

TABLE 8

| Classification | Comparative Example B | Embodiment B1 | Embodiment B2 | Embodiment B3 | Embodiment B4 | Embodiment B5 |
|---|---|---|---|---|---|---|
| EQE | 0.590 | 0.604 | 0.592 | 0.586 | 0.594 | 0.601 |
| IQE | 0.852 | 0.871 | 0.859 | 0.826 | 0.828 | 0.821 |
| Particle size (d50, μm) | 19.54 | 19.05 | 19.20 | 20.12 | 19.19 | 20.08 |

As illustrated in Table 8, since the organic coating was very thin, having a thickness less than or equal to 0.1 μm (for example, in sometimes, a few nm), it rarely changes optical properties or the sizes of the fluoride phosphor composite particles compared with the fluoride phosphor core particles.

Figure 11A:
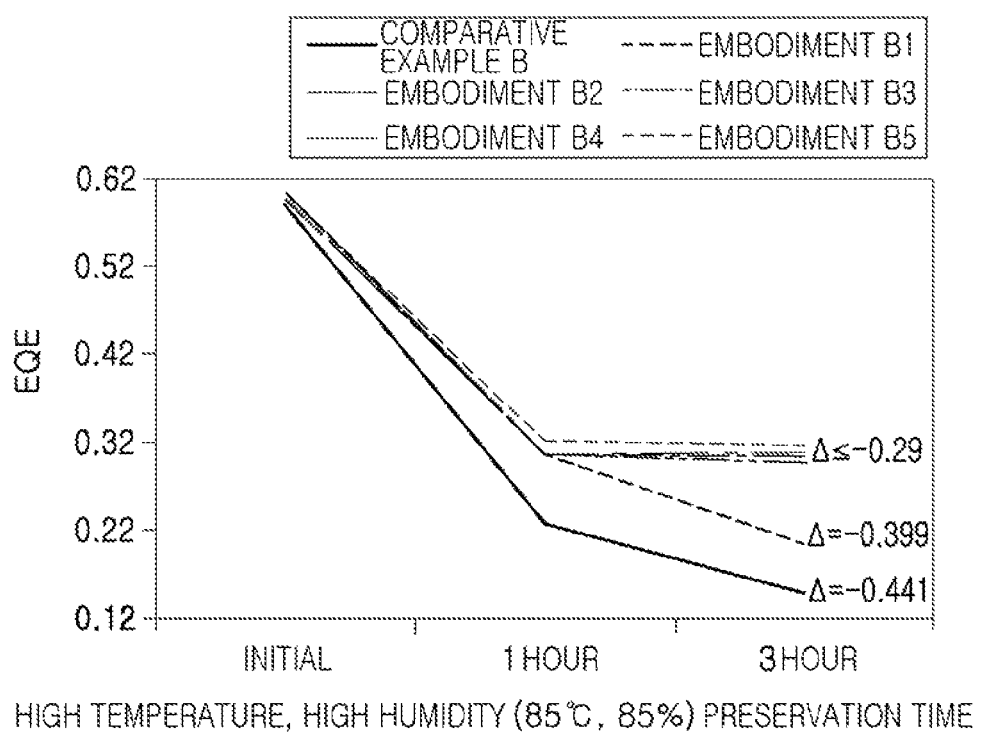
FIGS. 11A and 11B are graphs illustrating results (external quantum efficiency and internal quantum efficiency) of reliability evaluation of fluoride phosphor composites according to some embodiments (organic coating) of the present inventive concept.
Figure 11B:
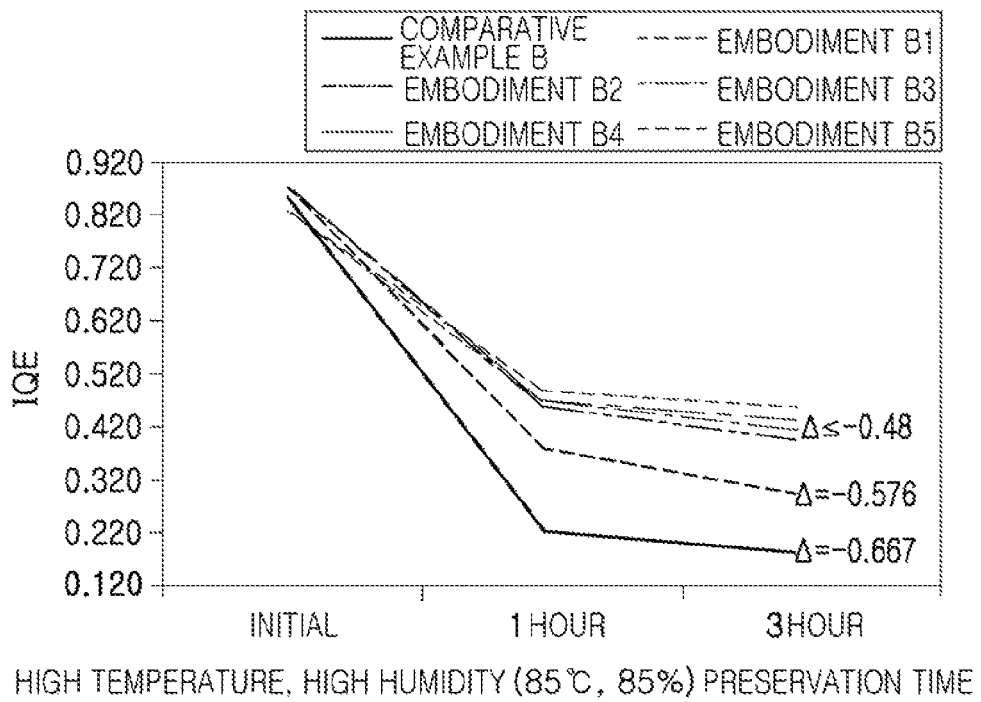

In order to test stability of the fluoride phosphor composite powders of the six samples (Comparative Example B and Embodiments B1 to B5) under high temperature and high humidity conditions, the fluoride phosphor composite powders of the six samples were preserved in a chamber having a temperature of 85° C. and relative humidity of 85% for one hour and three hours. Thereafter, variations in EQE and IQE of the fluoride phosphor composite powders of the six samples were measured when the fluoride phosphor composites were excited with light having a wavelength of 450 nm. FIGS. 11A and 11B show the result.

FIGS. 11A and 11B show that EQE and IQE of Comparative Example B are 14.9% and 18.5% respectively, and EQE and IQE of Embodiments B1 through B5 remain at levels ranging from 20.5% to 31.6% and from 29.5% to 45.7% respectively in three hours in an environment of high temperature and high humidity (85° C., 85%). In this manner, it showed that the fluoride phosphor composites having organic coating have higher durability against moisture and/or heat than fluoride phosphors without organic coatings.

Table 9 shows relative values of EQE of fluorides phosphor composites compared to the EQE of the Comparative Example B measured after 3-hour preservation. (85° C., 85%)

TABLE 9

| Classification | Comparative Example B | Embodiment B1 | Embodiment B2 | Embodiment B3 | Embodiment B4 | Embodiment B5 |
|---|---|---|---|---|---|---|
| Initial EQE (%) | 0.590 | 0.604 | 0.592 | 0.586 | 0.594 | 0.601 |
| 3 h EQE (%) | 0.149 | 0.205 | 0.299 | 0.306 | 0.306 | 0.316 |
| Relative value (%) | 100% | 138% | 201% | 205% | 205% | 212% |

As illustrated in Table 9, EQE of the fluoride phosphor composites excited with light having a wavelength of 450 nm after being preserved in the environment of high temperature and high humidity (85° C., 85%) for three hours may be about 130% or greater of EQE of the fluoride phosphor not coated with an organic material under the same conditions.

EXPERIMENT 2B

Evaluation of Influence According to Cleaning Number

Figure 12:
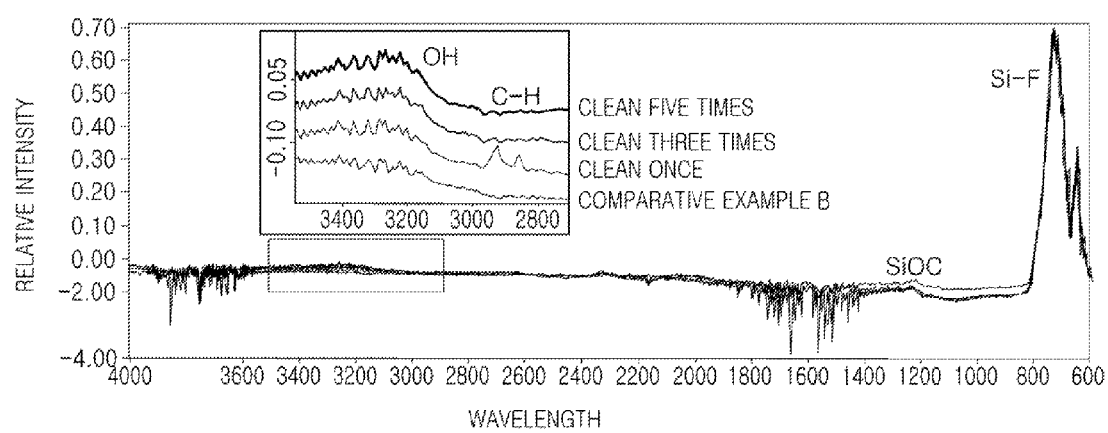
FIG. 12 is a graph illustrating Fourier transform infrared absorption (FTIR) spectroscopy for checking a remaining state of an organic coating based on a cleaning process according to an embodiment.

Since an excessive amount of organic material is introduced during the organic coating formation process, a cleaning process using acetone was performed to remove residual organic material from the $K_2SiF_6:Mn^{4+}$ phosphor composite particles of Embodiment B2 after the organic coating formation process. Samples were prepared by preforming the residue removing process once, three times, and five times respectively on the phosphor composite particles of Embodiment B2. The organic coating condition of each sample was examined using an FT-IR analysis method. Comparative Example B to which organic coating was not applied was also analyzed as a reference sample, and results thereof are illustrated in FIG. 12. A peak in the graph corresponding to C—H bond may show a residue of the organic coating material.

As illustrated in FIG. 12, the graphs of three times cleaning or more do not show a peak of C—H bond. One or two times of cleaning processes may be good to remove residue of the coating material from the fluoride phosphor composite particles.

EXPERIMENT 2C

Evaluation of Reliability of Phosphor in White Light Emitting Device Package In this experiment, a white light emitting apparatus was manufactured using the $K_2SiF_6:Mn^{4+}$ phosphor and its phosphor composites (Comparative Example B and Embodiments B1 to B3) obtained from Experiment 2A as a red phosphor. A blue LED chip having a dominant wavelength of 450 nm was used as a light source, and β-SiAlON was used as a green phosphor.

Each white light emitting apparatus was preserved in a chamber having a temperature of 85° C. and relative humidity of 85% for 500 hours, and luminance and color coordinates thereof were measured in 100 hours, 250 hours, and 500 hours. Graphs of FIGS. 13, 14A, and 14B shows the results.

Figure 13:
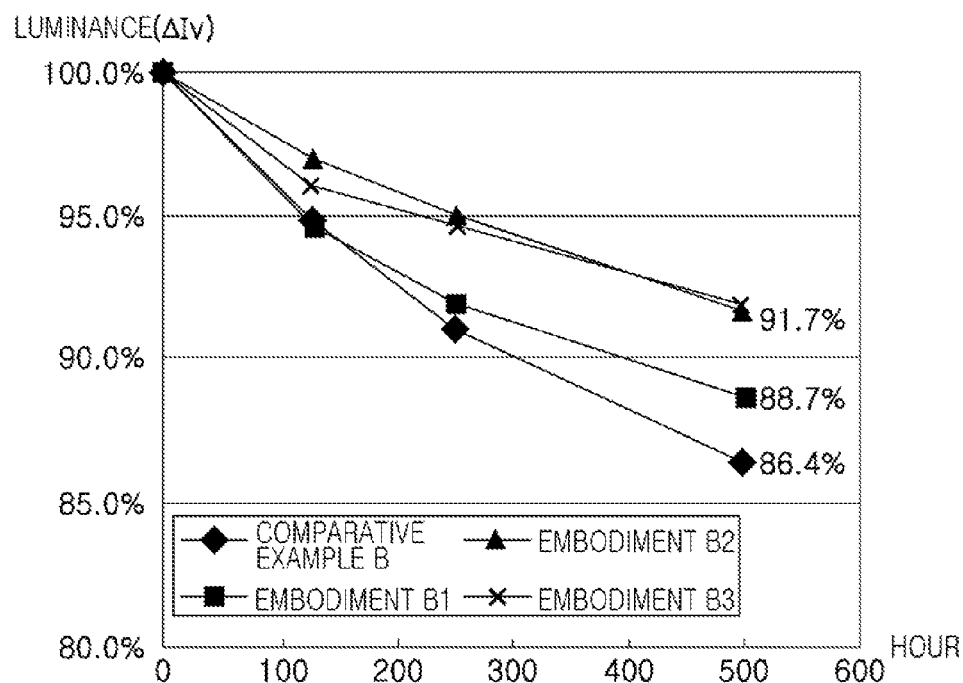
FIG. 13 is a graph illustrating results (change in luminance) of reliability evaluation of white light emitting apparatuses employing fluoride phosphor composites according to some embodiments (organic coating) of the present inventive concept.
Figure 14A:
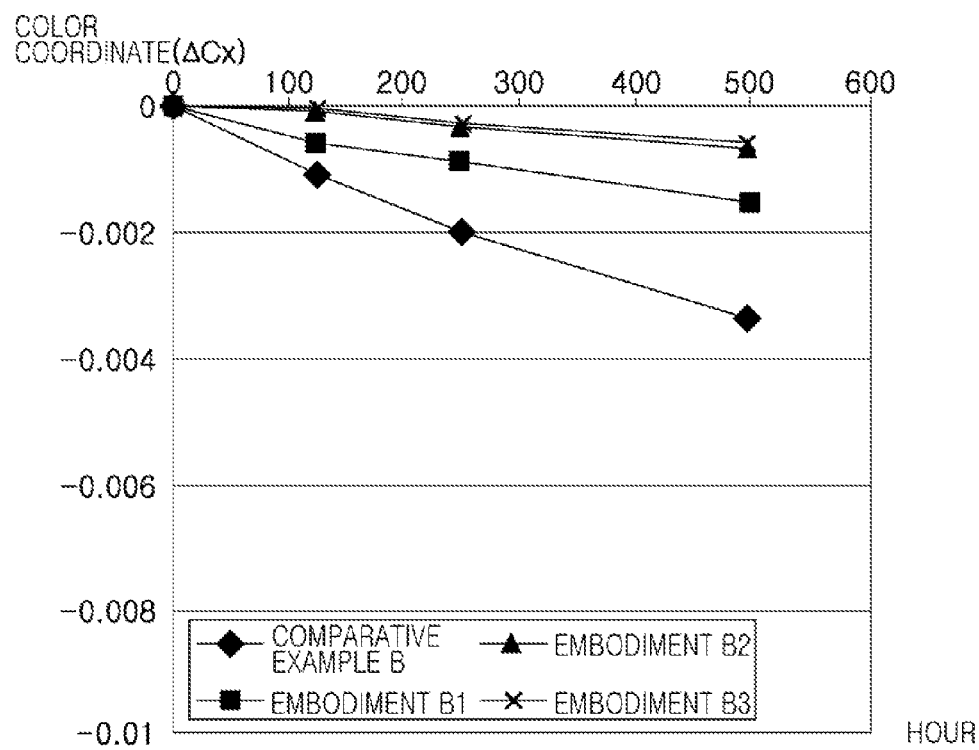
FIGS. 14A and 14B are graphs illustrating results (change in color coordinates) of reliability evaluation of white light emitting apparatuses employing fluoride phosphor composites according to some embodiments (organic coating) of the present inventive concept.
Figure 14B:
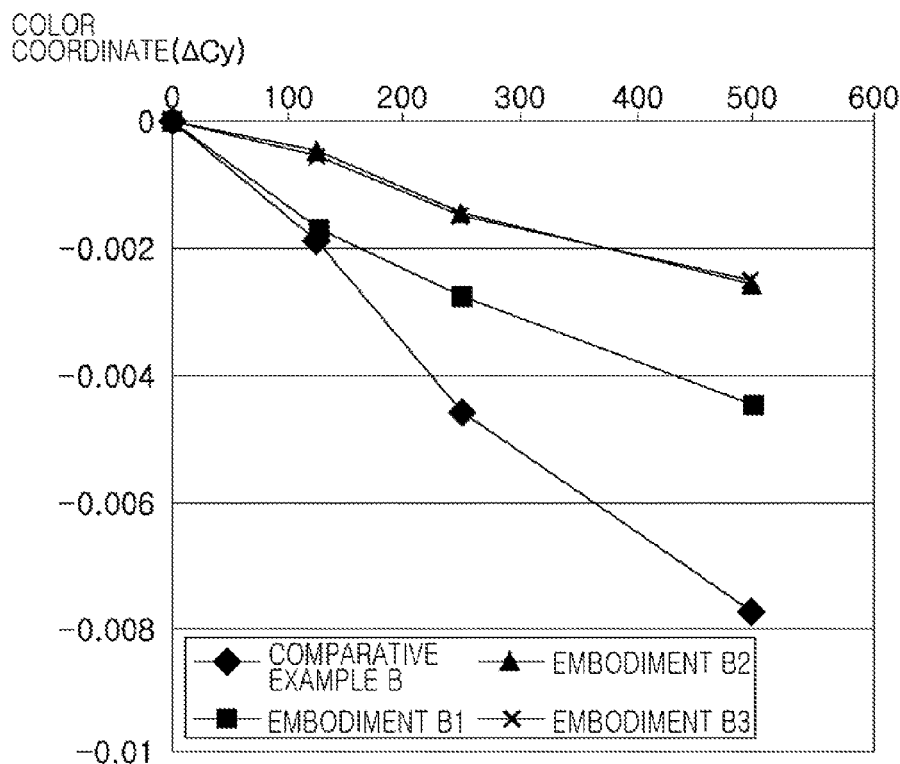

As illustrated in FIGS. 13, 14A, and 14B, Embodiments B1 to B3 were improved in luminance variations (ΔIv) and color coordinate variations (ΔCx and ΔCy) compared with Comparative Example B. Similarly to the moisture resistance test in FIGS. 11A and 11B, moisture resistance was enhanced as the ratio of the organic material to the fluoride phosphor core material increases. There was no significant difference when the ratio of organic material to the phosphor core material was 1.5:1 or greater.

Comparing white light emitting apparatus using a $K_2SiF_6:Mn^{4+}$ phosphor composite with a ratio of phosphor core to organic material 1.5:1 to the white light emitting apparatus using a phosphor without organic coating, the 500 hour luminance increased from 86.4% to 91.7%, and the 500 hour color coordinate shifts ΔCx and ΔCy decreased from −34/10000 to −6/10000 and from −78/10000 to −25/10000 respectively. Thus, it was confirmed that organic coating enhances phosphor composite's durability against moisture.

EXPERIMENT 3

Evaluation of Reliability of Phosphor in White Light Emitting Device Package In this experiment, a $K_2SiF_6:Mn^{4+}$ phosphor composite (having a core diameter equal to 16 μm and a shell thickness equal to 1.2 μm) was prepared by applying $K_2SiF_6$ fluoride under the same conditions as those of Embodiment A3 of Experiment 1A. After a fluoride coating process, the fluoride-coated $K_2SiF_6:Mn^{4+}$ phosphor composite was collected from an HF solution, and the collected fluoride-coated $K_2SiF_6:Mn^{4+}$ phosphor composite was cleaned with a hydrofluoric acid and acetone sequentially. In order to coat an organic material on the fluoride-coated $K_2SiF_6:Mn^{4+}$ phosphor composite, the phosphor composite and the organic material were evenly dispersed in the acetone solvent and the organic material was adsorbed on the surface of the fluoride phosphor composite to form a coating, and here, the solvent for the organic coating was prepared by mixing the phosphor composite and the organic material in a mole ratio of 1:1.5, thus preparing a $K_2SiF_6:Mn^{4+}$ phosphor composite (Embodiment C) having a dual-shell structure in which an organic coating is formed on the surface of the fluoride coating.

A white light emitting apparatus was manufactured under the same conditions as those of Experiment 2C using the $K_2SiF_6:Mn^{4+}$ phosphor composite (Embodiment C) having the dual-shell structure (organic coating+fluoride coating) as a red phosphor. Similarly, other white light emitting apparatuses were manufactured using the $K_2SiF_6:Mn^{4+}$ phosphor composite (Comparative Example B and Embodiment B2).

Figure 15:
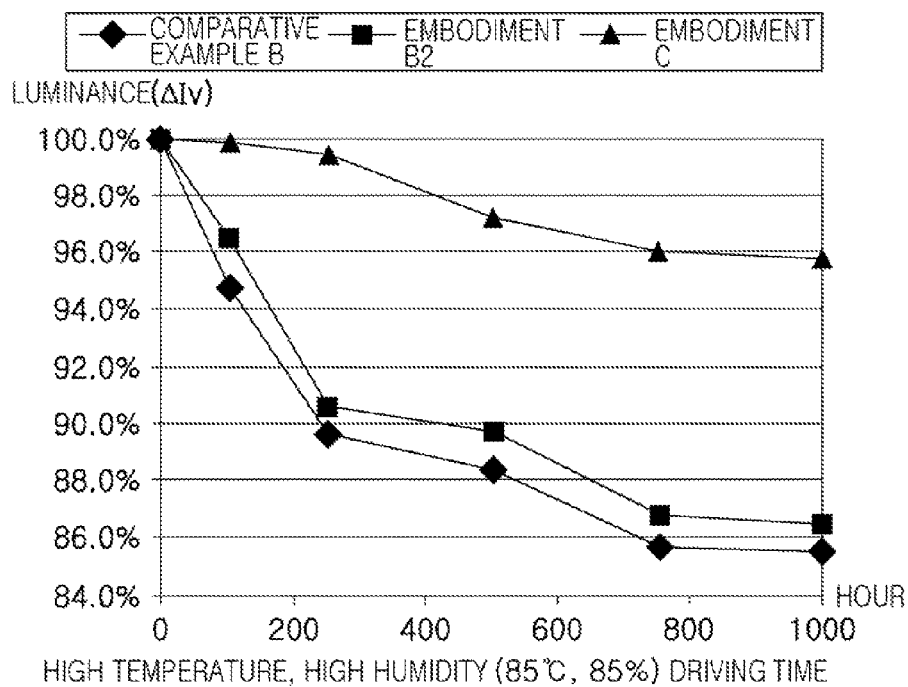
FIG. 15 is a graph illustrating results (driving, change in luminance) of reliability evaluation of white light emitting apparatuses employing fluoride phosphor composites according to some embodiments (fluoride coating+organic coating) of the present inventive concept.
Figure 16A:
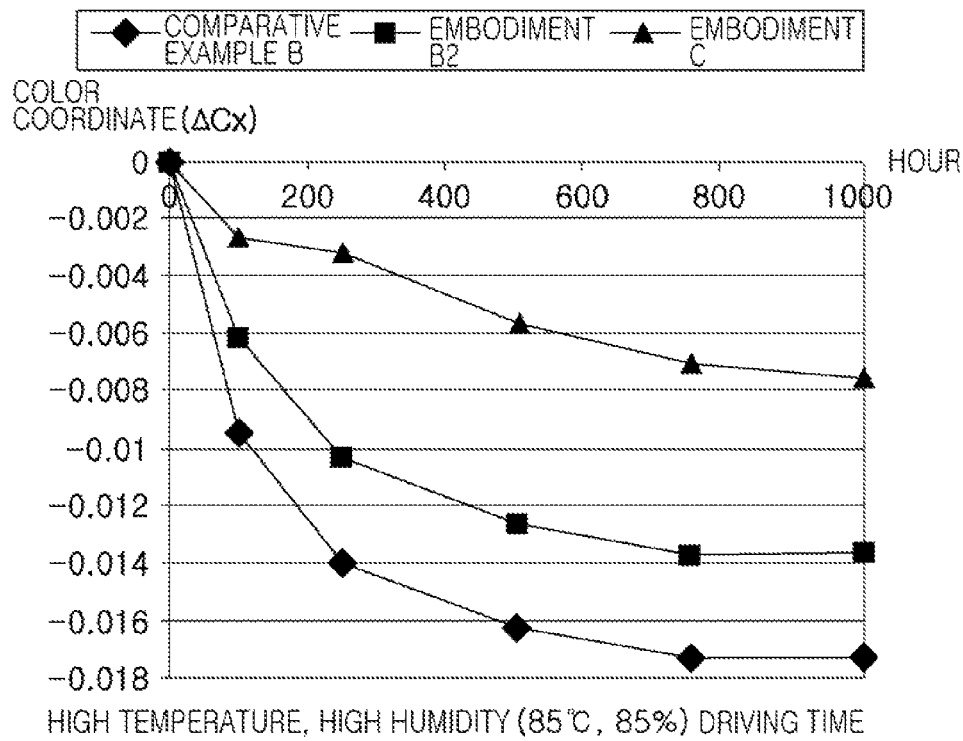
FIGS. 16A and 16B are graphs illustrating results (driving, change in color coordinates) of reliability evaluation of white light emitting apparatuses employing fluoride phosphor composites according to some embodiments (fluoride coating+organic coating) of the present inventive concept.
Figure 16B:
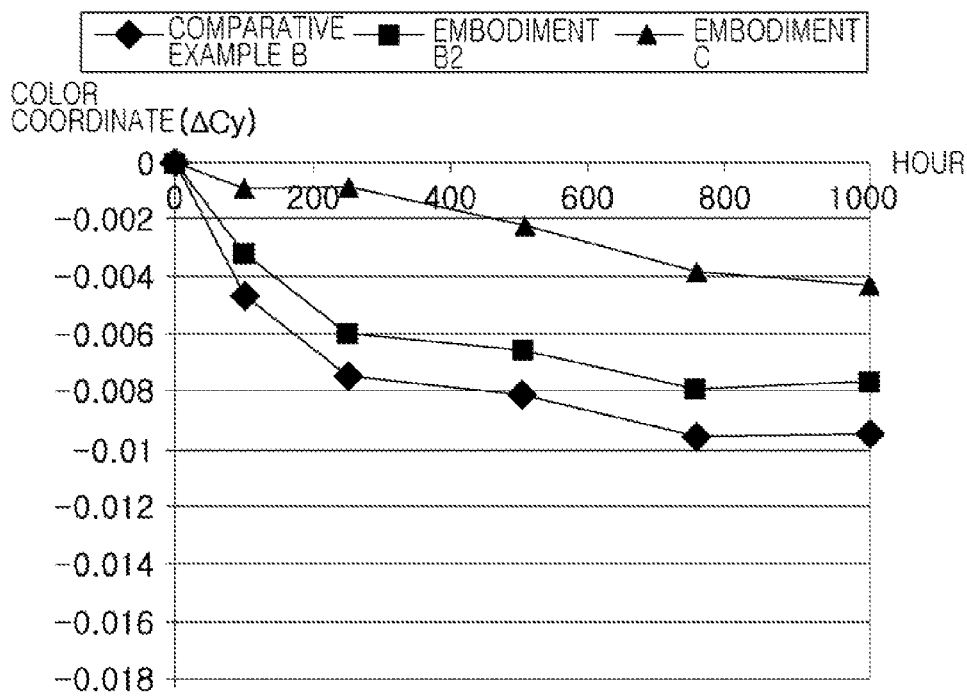

A driving test in a high temperature, high humidity environment was performed on each white light emitting apparatus in a chamber having a temperature of 85° C. and relative humidity of 85% under driving conditions in which a current of 150 mA flowed for 1000 hours, and luminance and color coordinates thereof were measured in 100 hours, 250 hours, 500 hours, 750 hours, and 1000 hours. The graphs of FIGS. 15, 16A and 16B show the result.

Figure 17:
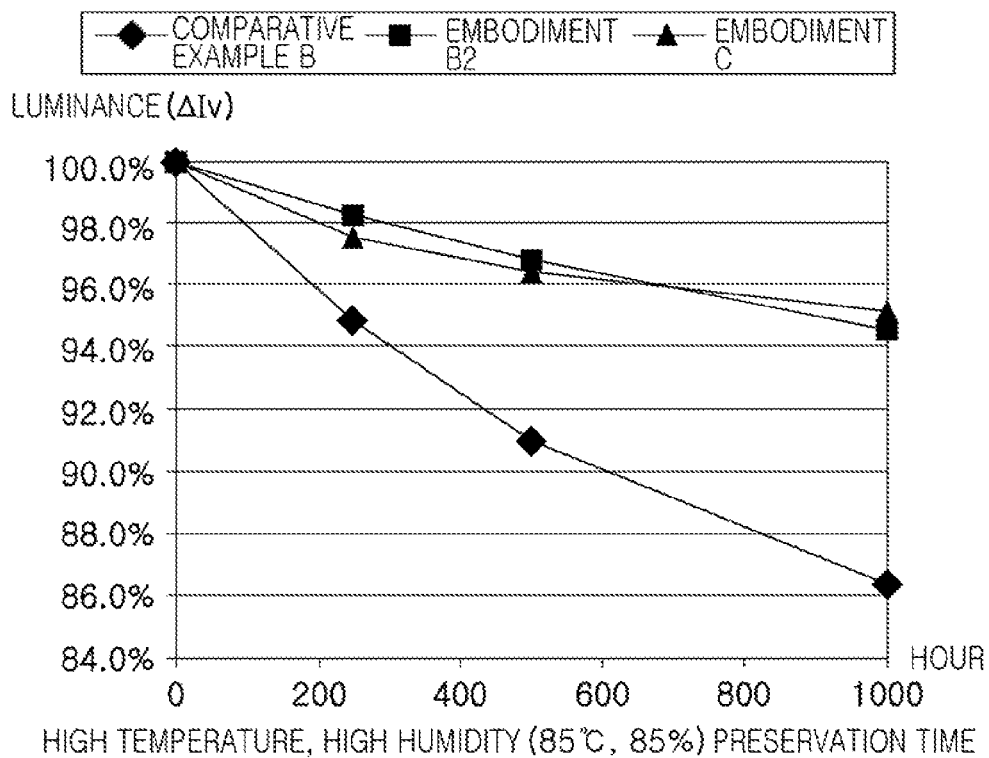
FIG. 17 is a graph illustrating results (driving, change in luminance) of a reliability evaluation of white light emitting apparatuses employing fluoride phosphor composites according to some embodiments (fluoride coating+organic coating) of the present inventive concept.
Figure 18A:
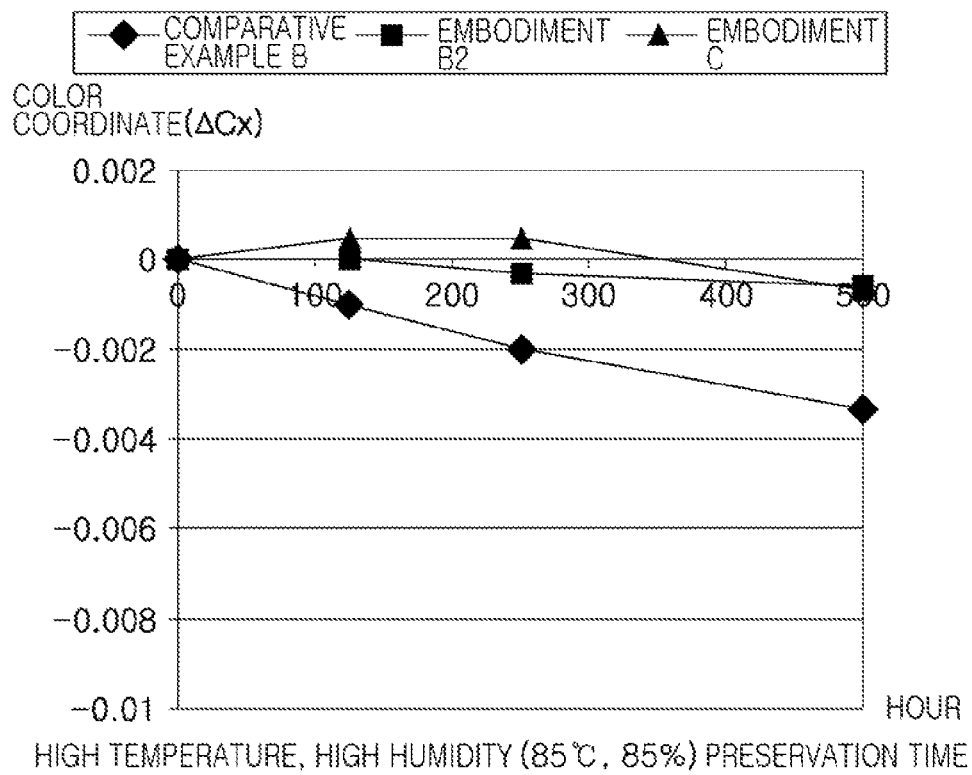
FIGS. 18A and 18B are graphs illustrating results (driving, change in luminance) of a reliability evaluation of white light emitting apparatuses employing fluoride phosphor composites according to some embodiments (fluoride coating+organic coating) of the present inventive concept.
Figure 18B:
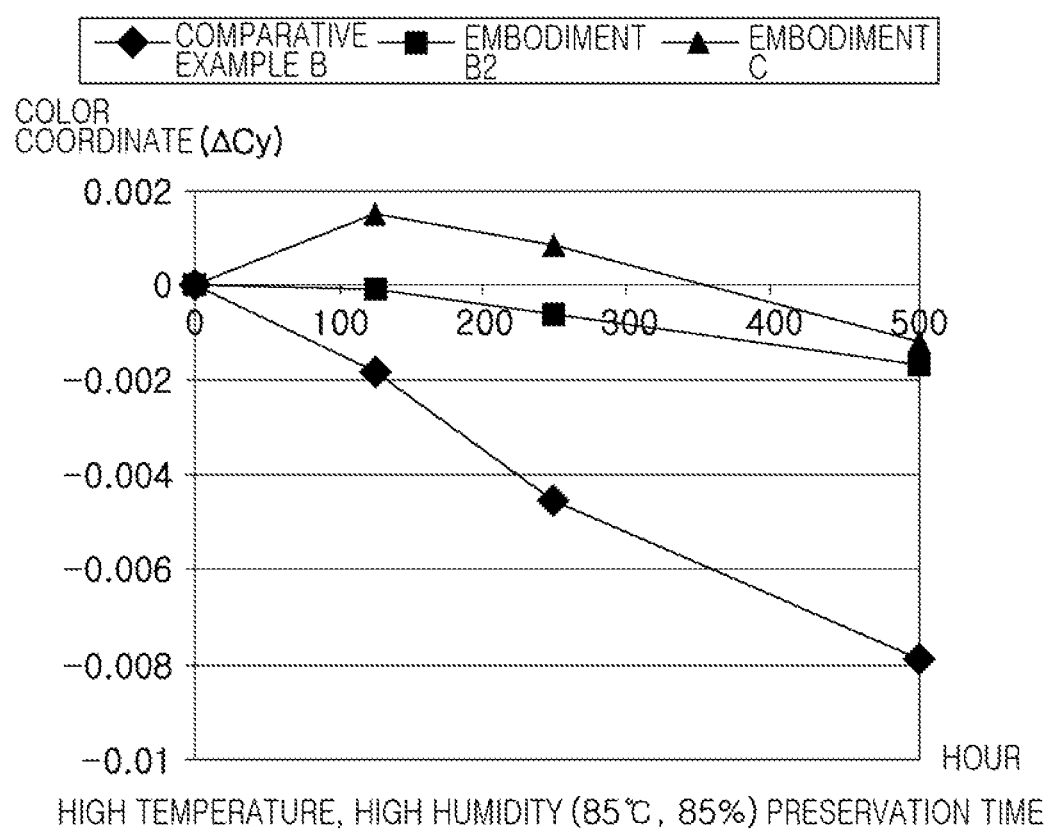

A preservation test under the same temperature and humidity was also performed on each white light emitting apparatus for 500 hours, and luminance and color coordinates were measured in 125 hours, 250 hours, and 500 hours. The graphs of FIGS. 17, 18A, and 18B show the result.

In the case of the preservation test, there was no significant difference between Embodiment B2 to which only organic coating was applied and Embodiment C having the dual-shell, but in a driving test close to actual usage conditions, Embodiment C showed a better result compared with Embodiment B2. One thousand hour luminance (after 1000 hours) of Embodiment C maintained 95.8% of its initial luminance in contrast to that Embodiment B2 maintained 86.6% of its initial luminance. One thousand hour color coordinate shifts (after 1000 hours) ΔCx and ΔCy of Embodiment C was −761/10000 and −428/10000 respectively in contrast to that the same of Embodiment B2 was −1362/10000 and −769/10000 respectively. In this manner, the dual-shell structure (Embodiment C) including the combination of the organic coating and the fluoride coating showed considerably enhanced durability over moisture, compared with the organic coating (Embodiment B2) under the driving conditions.

As a red phosphor, the fluoride phosphor composites having coatings according to the present exemplary embodiments have excellent wavelength conversion characteristics and have high reliability and optical properties even in a high temperature, high humidity environment, and thus, the fluoride phosphor composites may be advantageously used in various applications of products.

Figure 19A:
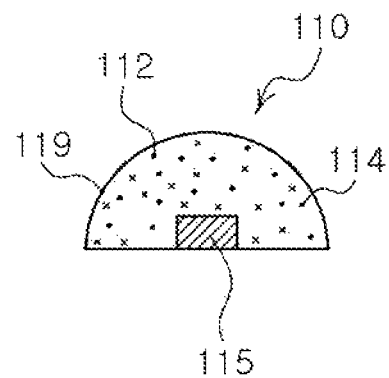
FIGS. 19A through 19C are cross-sectional views schematically illustrating white light emitting apparatuses according to various exemplary embodiments of the present inventive concept.
Figure 19B:
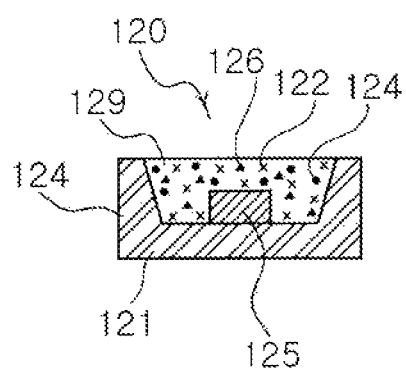
Figure 19C:
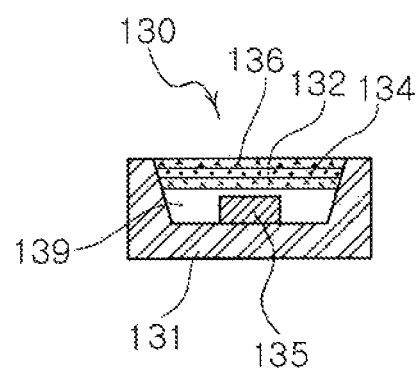

FIGS. 19A through 19C are cross-sectional views illustrating white light emitting apparatuses according to various exemplary embodiments of the present inventive concept.

FIG. 19A is a cross-sectional view schematically illustrating a white light emitting apparatus according to an exemplary embodiment of the present inventive concept.

As illustrated in FIG. 19A, a white light emitting apparatus 110 includes a blue semiconductor light emitting device 115 and a resin packing unit 119 packing the blue semiconductor light emitting device 115 and having an upwardly convex lens shape.

In the present exemplary embodiment, the resin packing unit 119 may have a hemispherical lens structure having a wide beam angle. The blue semiconductor light emitting device 115 may be directly mounted on a separate circuit board. The resin packing unit 119 may be formed of a silicon resin, an epoxy resin, or a combination thereof. A green phosphor 114 and a red phosphor 112 may be dispersed within the resin packing unit 119.

As the red phosphor 112, a fluoride phosphor composite described in various embodiments above may be used. For example, the red phosphor 112 may include a fluoride phosphor core expressed by the empirical formula AxMFy:Mn4+, and at least one of a fluoride coating and an organic coating may be employed as a shell on the surface of the fluoride phosphor core. In the empirical formula, A is at least one selected from the group consisting of Li, Na, K, Rb, and Cs, M is at least one selected from the group consisting of Si, Ti, Zr, Hf, Ge, and Sn, the composition ratio (x) of A satisfies 2≤x≤3, and the composition ratio (y) of F satisfies 4≤y≤7. For example, the red phosphor 112 may be a fluoride phosphor expressed as $K_2SiF_6$:$Mn^{4+}$ or a fluoride phosphor composite including a fluoride phosphor core expressed as $K_2SiF_6$:$Mn^{4+}$.

The red phosphor 112 may additionally include a different red phosphor. For example, the additional red phosphor may be at least one selected from among a nitride-based phosphor as $M1AlSiN_x$:Re (1≤x≤5), a sulfide-based phosphor as M1D:Re, and a silicate-based phosphor as $(Sr,L)_2SiO_{4-x}N_y$:Eu, where 0<x<4 and y=2x/3. Here, M1 is at least one element selected from among Ba, Sr, Ca, and Mg, D is at least one element selected from among S, Se, and Te, L is at least one element selected from the group consisting of Ba, Sr, Ca, Mg, Li, Na, K, Rb, and Cs, and Re is at least one element selected from among Y, La, Ce, Nd, Pm, Sm, Gd, Tb, Dy, Ho, Er, Tm, Yb, Lu, F, Cl, Br, and I.

The green phosphor 114 may include at least one among an oxide-based phosphor expressed by the empirical formula $M_3Al_5O_{12}$, an oxynitride-based phosphor, a β-SiALON phosphor expressed by the empirical formula $Si_{6-z}Al_zO_zN_{8-z}$, and a $La_3Si_6N_{11}$:Ce phosphor. Here, M may be at least one selected from the group consisting of Y, Lu, Gd, Ga, Be, Mg, Ca, Sr, Ba, and Zn. As the oxynitride-based phosphor, an oxynitride phosphor expressed by the empirical formula $M1_xA_yO_xN_{(4/3)y}$ or an oxynitride phosphor expressed by the empirical formulas $M_{1a}A_bO_cN_{((2/3)a+(4/3)b-(2/3)c)}$ may be used. Here, M1 is at least one selected from the group consisting of Ba, Sr, Ca, and Mg, and A is at least one selected from the group consisting of C, Si, Ge, Sn, Ti, Zr, and Hf.

In this manner, by combining the red phosphor 112 and the green phosphor 114 together with the blue semiconductor light emitting device 115, white light having a high color rendering index (e.g., 70 or greater) may be provided. Since the plurality of phosphors emit various wavelength bands, a display apparatus including the white light emitting apparatus 110 may have an enhanced color gamut. A dominant wavelength of the blue semiconductor light emitting device 115 may range from 420 nm to 470 nm. The red phosphor 112 employed in the present exemplary embodiment may have a wavelength peak in a short wavelength band (600 nm to 630 nm) of a red band. For example, the red phosphor 112 may have a wavelength peak ranging from 600 nm to 620 nm. The wavelength peak of the light of the green phosphor 114 may range from 500 nm to 550 nm.

The blue semiconductor light emitting device 115 may have a full width at half maximum (FWHM) ranging from 10 nm to 50 nm, the red phosphor 112 may have a FWHM ranging from 50 nm to 180 nm, and the green phosphor 114 may have a FWHM ranging from 30 nm to 200 nm.

The red phosphor 112 employed in the present exemplary embodiment may have high luminance and high reliability maintained in a high temperature, high humidity environment as described in the previous exemplary embodiments, high luminance and excellent white light, compared with the prior art, may be obtained in a package environment.

In certain embodiments, yellow and/or orange yellow phosphors may be included in addition to the red phosphor 112 and the green phosphor 114. In this case, a further enhanced color rendering index may be secured. This exemplary embodiment is illustrated in FIG. 19B.

A white light emitting apparatus 120 illustrated in FIG. 19B may include a package body 121 in which a reflective cup is formed in the center thereof, a blue semiconductor light emitting device 125 mounted on a bottom portion of the reflective cup, and a resin packing unit 129 encapsulating the blue semiconductor light emitting device 125 within the reflective cup.

In the present exemplary embodiment, the resin packing unit 129 includes a third phosphor such as a yellow or orange yellow phosphor 126 together with a red phosphor 122 and a green phosphor 124. The red phosphor 122 may include the fluoride phosphor composite described above in various embodiments and, as the green phosphor 124, the same material as the green phosphor 114 described above with reference to FIG. 19A may be used.

As the yellow phosphor, a silicate-based phosphor, a garnet-based phosphor such as YAG or TAG, and a nitride-based phosphor may be used. As the orange yellow phosphor, an α-SiAlON:Re phosphor may be used.

In the embodiments illustrated in FIGS. 19A and 19B, two or more types of phosphor are disposed in the single resin packing unit, but the resin packing unit may be variously modified to wavelength conversion units having other structures. For example, two or three types of phosphor may be positioned in different layers, providing a plurality of layers. This exemplary embodiment is illustrated in FIG. 19C.

A white light emitting apparatus 130 illustrated in FIG. 19C includes a package body 131 in which a reflective cup is formed in the center thereof, a blue LED 135 mounted on a bottom portion of the reflective cup, and a resin packing unit 139 encapsulating the blue LED 135 within the reflective cup.

Resin layers 132, 134, and 136 containing different phosphors may be disposed on the resin packing unit 139. The plurality of resin layers may include a first resin layer containing a red phosphor 132, a second resin layer containing a green phosphor 134, and a third resin layer containing an orange yellow phosphor 136. The phosphors employed in the present exemplary embodiment may be the same as or similar to the phosphors described above with reference to FIGS. 19A and 19B. For example, the red phosphor 132 may be the fluoride phosphor composite described in various embodiment above.

An excellent white light emitting apparatus may be realized using the fluoride phosphor composite described above. For example, as described above, the degrees of degradation of luminance and color coordinates of the red phosphor according to the various embodiments described above are small even in a high temperature, high humidity environment. Thus, a degradation of luminance and a reduction in a usage lifespan caused by a degradation of conversion efficiency may be alleviated. Since a color coordinate shift is reduced, a change in a correlated color temperature (CCT) value may be reduced and color rendering index (CRI) characteristics may be maintained in an acceptable value range in a lighting device and a degradation of efficiency caused by a reduction in a color gamut and a reduction in color matching rate of color filters may be prevented or reduced in a display apparatus including a backlight unit (BLU).

Figure 20:
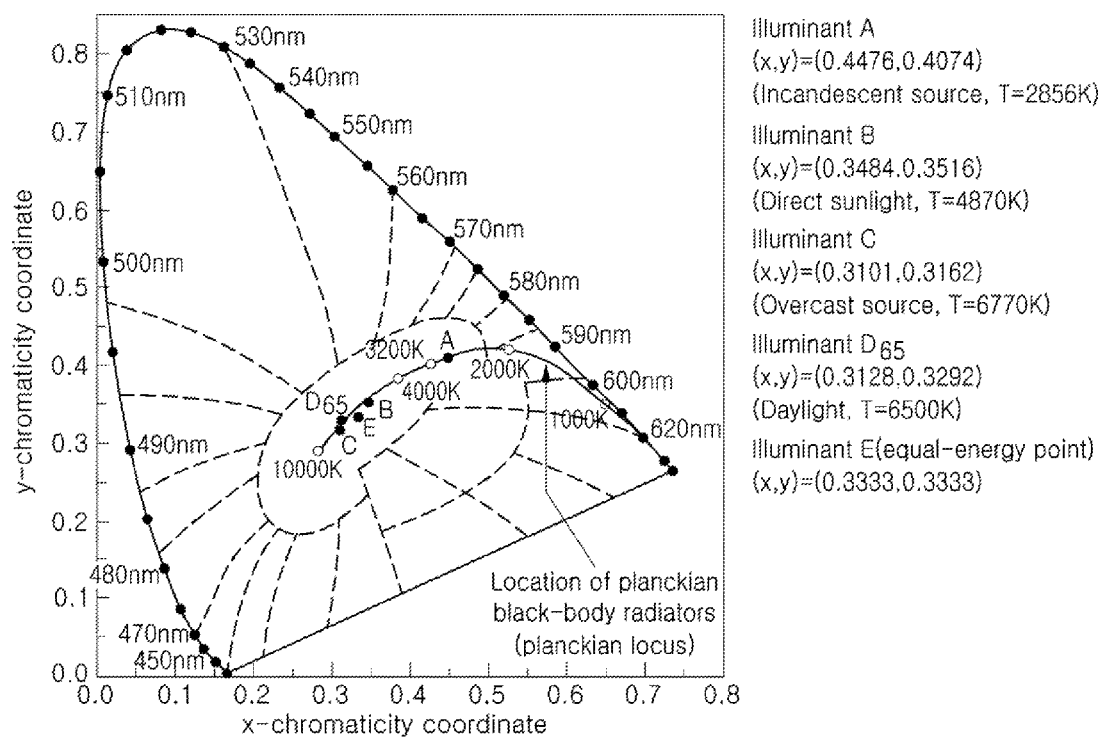
FIG. 20 is a CIE 1931 color space chromaticity diagram illustrating wavelength conversion materials that may be employed in a white light emitting apparatus according to an exemplary embodiment of the present inventive concept.

FIG. 20 is a CIE 1931 color space chromaticity diagram illustrating wavelength conversion materials that may be employed in a white light emitting apparatus according to an exemplary embodiment of the present inventive concept.

When a semiconductor light emitting device emits blue light, a package including the light emitting device may emit white light when the package includes at least one among yellow, green, and red phosphors, and the white light may have various color temperatures according to mixture ratios of the phosphors. For example, a color temperature and a CRI of white light may be adjusted by additionally combining a green and/or a red phosphor with a yellow phosphor.

Referring to the CIE 1931 color space chromaticity diagram illustrated in FIG. 20, white light generated by combining yellow, green, and red phosphors with a UV or blue LED and/or by combining green and red light LEDs therewith, may have two or more peak wavelengths and may be positioned in a segment linking (x, y) coordinates (0.4476, 0.4074), (0.3484, 0.3516), (0.3101, 0.3162), (0.3128, 0.3292), (0.3333, 0.3333) of the CIE 1931 chromaticity diagram of FIG. 20. Alternatively, white light may be positioned in a region surrounded by a spectrum of black body radiation and the segment. A color temperature of white light may correspond to a range from about 2000K to about 20000K.

The following phosphors may be used in the white light emitting apparatus of the embodiments described above. In case of a red phosphor, the fluoride phosphor composite according to the embodiments described above may be used. For example, the red phosphor 114 may include a fluoride phosphor composite having a fluoride phosphor core expressed by the empirical formula AxMFy:Mn4+, and at least one of a fluoride coating and an organic coating may be employed as a shell on a surface of the fluoride phosphor core. For example, the red phosphor 114 may be a fluoride phosphor composite having a fluoride phosphor core such as $K_2SiF_6:Mn^{4+}$, $K_2TiF_6:Mn^{4+}$, $NaYF_4:Mn^{4+}$, and $NaGdF_4:Mn^{4+}$. In the white light emitting apparatus, the following phosphors may be additionally used selectively.

Oxides: Yellow and/or green $Y_3Al_5O_{12}$:Ce, $Tb_3Al_5O_{12}$:Ce, $Lu_3Al_5O_{12}$:Ce Silicates: Yellow and/or green $(Ba,Sr)_2SiO_4$:Eu, yellow and/or orange $(Ba,Sr)_3SiO_3$:Ce, $Ca_{1.2}Eu_{0.8}SiO_4$ corresponding to red $Ca_2SiO_4$:Eu Nitrides: Green β-SiAlON:Eu, yellow $La_3Si_6N_{11}$:Ce, orange α-SiAlON:Eu, red $CaAlSiN_3$:Eu, $Sr_2Si_5N_8$:Eu, $SrSiAl_4N_7$:Eu, $SrLiAl_3N_4$: Eu, $Ln_{4-x}(Eu_zM_{1-z})_xSi_{12-y}Al_yO_{3+x+y}N_{18-x-y}$, where 0.5≤x≤3, 0<z<0.3, and 0<y≤4 (Here, Ln may be at least one type of element selected from the group consisting of Group IIIa elements and rare earth elements, and M may be at least one type of element selected from the group consisting of calcium (Ca), barium (Ba), strontium (Sr), and magnesium (Mg)).

The foregoing phosphor compositions should basically conform to Stoichiometry, and respective elements may be substituted with different elements of respective groups of the periodic table. For example, strontium (Sr) may be substituted with barium (Ba), calcium (Ca), magnesium (Mg), and the like, of alkali earths, and yttrium (Y) may be substituted with terbium (Tb), lutetium (Lu), scandium (Sc), gadolinium (Gd), and the like. Also, europium (Eu), an activator, may be substituted with cerium (Ce), terbium (Tb), praseodymium (Pr), erbium (Er), ytterbium (Yb), and the like, according to a desired energy level. An activator may be applied alone, or a coactivator, or the like, may be additionally applied to change characteristics.

Phosphors may be replaced with any other wavelength conversion materials such as quantum dots. In a particular wavelength band, quantum dots may be used alone or as a mixture with phosphors. A quantum dot (QD) may have a structure including a core (having a diameter ranging from 3 nm to 10 nm) such as CdSe or InP, a shell (having a thickness ranging from 0.5 nm to 2 nm) such as ZnS or ZnSe, and a ligand for stabilizing the core and the shell, and may realize various colors according to sizes.

Table 10 below illustrates types of phosphors according to application fields of white light emitting apparatuses using a UV light emitting device (wavelength: 200 nm to 440 nm) or a blue light emitting device (wavelength: 440 nm to 480 nm).

TABLE 10

| Purpose | Phosphor |
| --- | --- |
| LED TV BLU | β-SiAlON:$Eu^{2+}$, (Ca,Sr)AlSiN$_3$:$Eu^{2+}$, La$_3$Si$_6$N$_{11}$:$Ce^{3+}$, K$_2$SiF$_6$:$Mn^{4+}$, SrLiAl$_3$N$_4$:Eu, Ln$_{4-x}$(Eu$_z$M$_{1-z}$)$_x$Si$_{12-y}$Al$_y$O$_{3+x+y}$N$_{18-x-y}$(0.5 ≤ x ≤ 3, 0 < z < 0.3, 0 < y ≤ 4), K$_2$TiF$_6$:$Mn^{4+}$, NaYF$_4$:$Mn^{4+}$, NaGdF$_4$:$Mn^{4+}$ Ca2SiO4:$Eu^{2+}$, Ca1.2Eu0.8SiO4 |
| Lighting | Lu$_3$Al$_5$O$_{12}$:$Ce^{3+}$, Ca-α-SiAlON:$Eu^{2+}$, La$_3$Si$_6$N$_{11}$:$Ce^{3+}$, (Ca,Sr)AlSiN$_3$:$Eu^{2+}$, Y$_3$Al$_5$O$_{12}$:$Ce^{3+}$, K$_2$SiF$_6$:$Mn^{4+}$, SrLiAl$_3$N$_4$:Eu, Ln$_{4-x}$(Eu$_z$M$_{1-z}$)$_x$Si$_{12-y}$Al$_y$O$_{3+x+y}$N$_{18-x-y}$ (0.5 ≤ x ≤ 3, 0 < z < 0.3, 0 < y ≤ 4), K$_2$TiF$_6$:$Mn^{4+}$, NaYF$_4$:$Mn^{4+}$, NaGdF$_4$:$Mn^{4+}$, Ca2SiO4:$Eu^{2+}$, Ca1.2Eu0.8SiO4 |
| Side Viewing (Mobile device, Note book) | Lu$_3$Al$_5$O$_{12}$:$Ce^{3+}$, Ca-α-SiAlON:$Eu^{2+}$, La$_3$Si$_6$N$_{11}$:$Ce^{3+}$, (Ca,Sr)AlSiN$_3$:$Eu^{2+}$, Y$_3$Al$_5$O$_{12}$:$Ce^{3+}$, (Sr,Ba,Ca,Mg)$_2$SiO$_4$:$Eu^{2+}$, K$_2$SiF$_6$:$Mn^{4+}$, SrLiAl$_3$N$_4$:Eu, Ln$_{4-x}$(Eu$_z$M$_{1-z}$)$_x$Si$_{12-y}$Al$_y$O$_{3+x+y}$N$_{18-x-y}$(0.5 ≤ x ≤ 3, 0 < z < 0.3, 0 < y ≤ 4), K$_2$TiF$_6$:$Mn^{4+}$, NaYF$_4$:$Mn^{4+}$, NaGdF$_4$:$Mn^{4+}$, Ca2SiO4:$Eu^{2+}$, Ca1.2Eu0.8SiO4 |
| Electrical component (Head Lamp, etc.) | Lu$_3$Al$_5$O$_{12}$:$Ce^{3+}$, Ca-α-SiAlON:$Eu^{2+}$, La$_3$Si$_6$N$_{11}$:$Ce^{3+}$, (Ca,Sr)AlSiN$_3$:$Eu^{2+}$, Y$_3$Al$_5$O$_{12}$:$Ce^{3+}$, K$_2$SiF$_6$:$Mn^{4+}$, SrLiAl$_3$N$_4$:Eu, Ln$_{4-x}$(Eu$_z$M$_{1-z}$)$_x$Si$_{12-y}$Al$_y$O$_{3+x+y}$N$_{18-x-y}$ (0.5 ≤ x ≤ 3, 0 < z < 0.3, 0 < y ≤ 4), K$_2$TiF$_6$:$Mn^{4+}$, NaYF$_4$:$Mn^{4+}$, NaGdF$_4$:$Mn^{4+}$, Ca2SiO4:$Eu^{2+}$, Ca1.2Eu0.8SiO4 |

In certain embodiments, the color temperature of a light emitting apparatus may be realized to fit with an ambient atmosphere by selectively mixing plural colors, for example, violet, blue, green, red, orange, and the like. For example, a white light emitting device package having a color temperature of 4000K, another white light emitting device package having a color temperature of 3000K, and a red light emitting device package may be disposed in a single module, and, by controlling the output of each of the light emitting device packages by independently driving the light emitting device packages, the color temperature may be adjusted within a range from 2000K to 4000K. By doing this, a white light emitting module having a color rendering index (Ra) ranging from 85 to 99 may be manufactured.

In another example, a white light emitting device package having a color temperature of 5000K and a white light emitting device package having a color temperature of 2700K may be disposed in a single module, and, by controlling the output of each of the white light emitting device packages by independently driving the white light emitting device packages, the color temperature may be adjusted within a range from 2700K to 5000K. By doing this, a white light emitting module having a color rendering index (Ra) ranging from 85 to 99 may be manufactured.

The number of light emitting device packages may vary according to set values of a basic color temperature. When a set value of the basic color temperature is about 4000K, the number of light emitting device packages corresponding to the color temperature 4000K may be greater than the number of light emitting device packages having a color temperature equal to 3000K or the number of red light emitting device packages.

Figure 30:
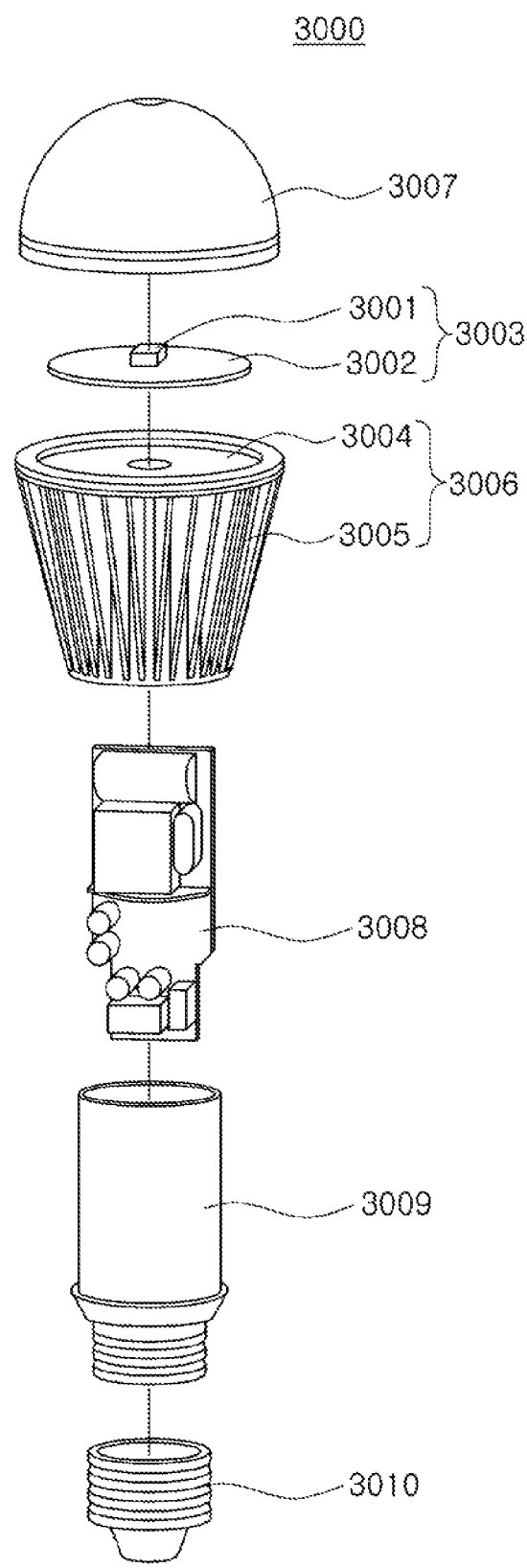
FIG. 30 is an exploded perspective view illustrating a bulb-type lighting device according to an exemplary embodiment of the present inventive concept.

In this manner, the module adjustable in the CRI and the color temperature may be advantageously used in a lighting device illustrated in FIG. 30. The semiconductor light emitting device and a package (or module) having the same according to the embodiments described above may be advantageously applied to various products.

Figure 21A:
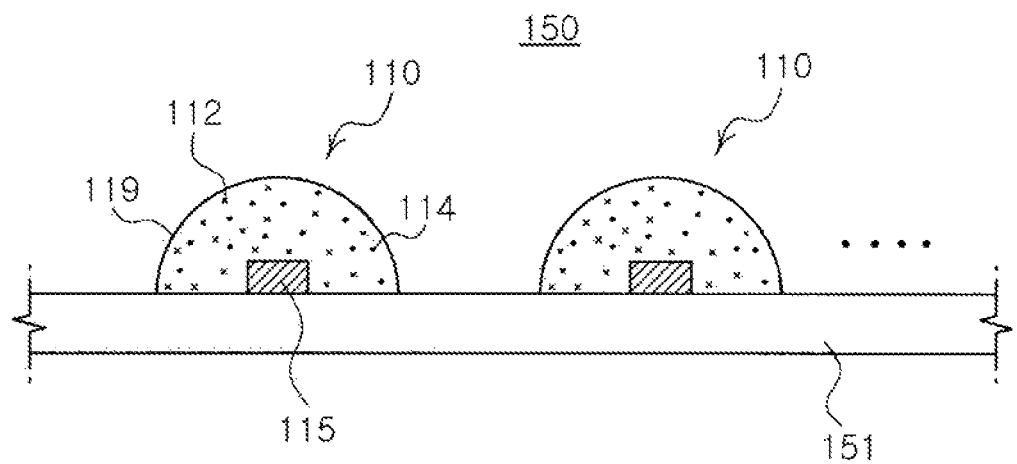
FIGS. 21A and 21B are cross-sectional view schematically illustrating LED light source modules according to various exemplary embodiments of the present inventive concept.
Figure 21B:
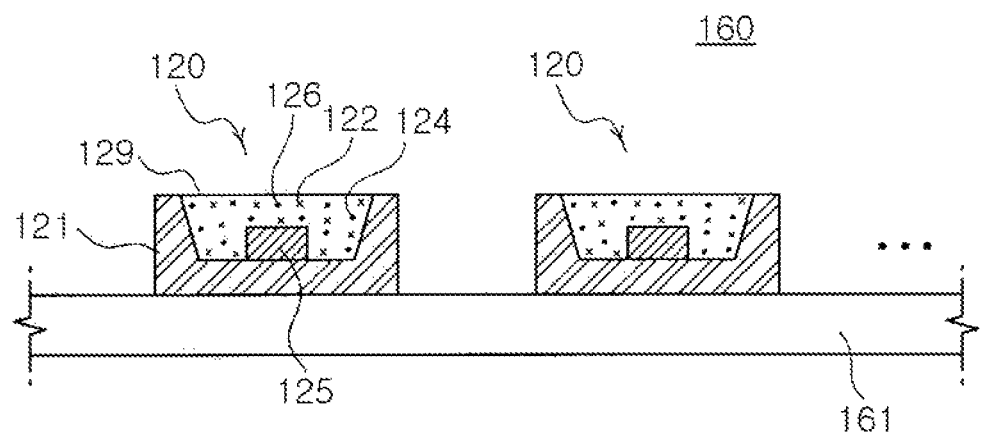

For example, a light source module may be used in a light source device such as an LCD backlight unit or a lighting device. FIGS. 21A and 21B illustrate such a white light source module.

Referring to FIG. 21A, a white light source module 150 includes a circuit board 151 and a plurality of white light emitting apparatuses 110 mounted thereon. The plurality of white light emitting apparatuses 110 may be the white light emitting apparatus illustrated in FIG. 19A.

In the present exemplary embodiment, the blue semiconductor light emitting device 115 may be directly mounted on the circuit board 151 in a chip-on-board (COB) manner. Each of the blue semiconductor light emitting devices 115 may be electrically connected to a circuit line provided on an upper surface of the circuit board 151.

Referring to FIG. 21B, a white light source module 160 includes a circuit board 161 and a plurality of white light emitting apparatuses 120 mounted thereon. As illustrated in FIG. 21B, each of the white light emitting apparatuses 120 may include a blue semiconductor light emitting device 125 mounted within a reflective cup of the package body 121 and a resin packing unit 129 encapsulating the blue semiconductor light emitting device 125. Yellow or orange yellow phosphors 126 together with red and green phosphors 122 and 124 may be dispersed within the resin packing unit 129. Unlike the example illustrated in FIG. 21A, the blue semiconductor light emitting device 125 may be electrically connected to a circuit line of the circuit board 161 through the package body 121.

Figure 22A:
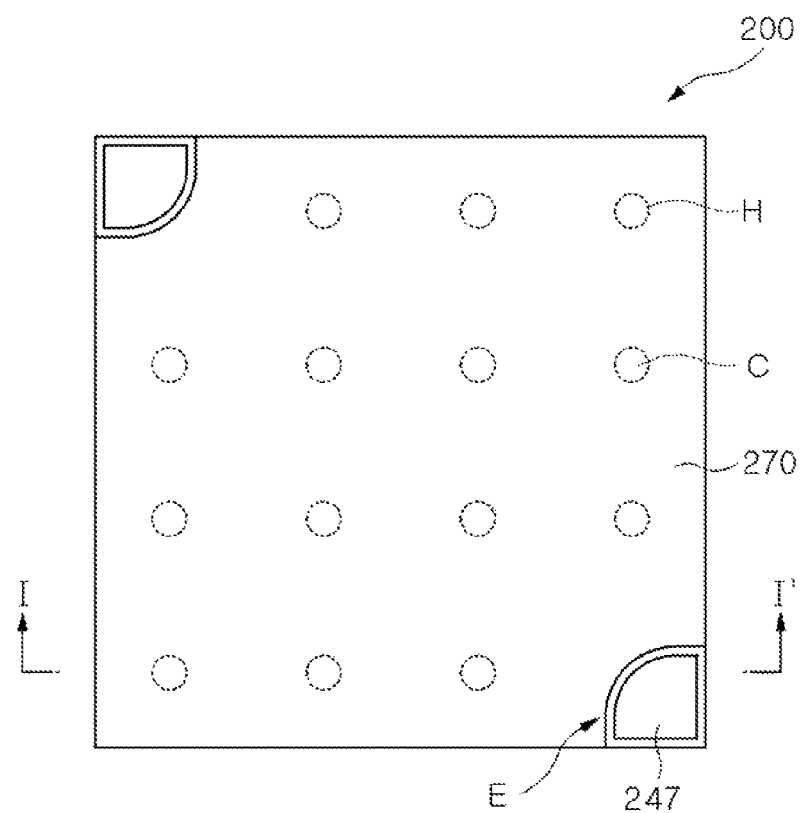
FIGS. 22A and 22B are a plan view and a side cross-sectional view illustrating examples of a semiconductor light emitting device employable in a white light emitting apparatus according to an exemplary embodiment of the present inventive concept.
Figure 22B:
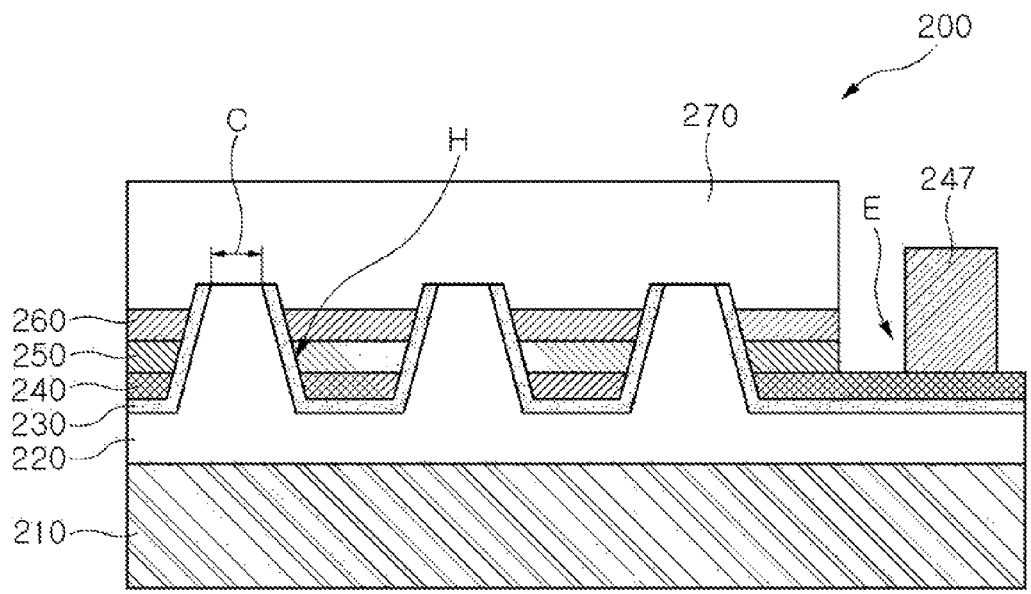

White light emitting apparatuses according to an exemplary embodiment may employ various types of semiconductor light emitting device. FIGS. 22A and 22B are respectively a plan view and a cross-sectional view illustrating an example of a light emitting device that may be employed in an exemplary embodiment. FIG. 22B is a cross-sectional view taken along line I-I' of FIG. 22A.

Referring to FIGS. 22A and 22B, a semiconductor light emitting device 200 includes a conductive substrate 210, a first electrode 220, an insulating layer 230, a second electrode 240, a second conductivity-type semiconductor layer 250, an active layer 260, and a first conductivity-type semiconductor layer 270, and these layers are sequentially stacked to be provided. The first and second conductivity-type semiconductor layers 270 and 250 may be a p-type nitride semiconductor layer and an n-type nitride semiconductor layer, respectively.

The conductive substrate 210 may be a metal substrate or a semiconductor substrate having electrical conductivity. For example, the conductive substrate 210 may be a metal substrate including any one among Au, Ni, Cu, and W, or a semiconductor substrate including any one among Si, Ge, and GaAs.

The first electrode 220 is disposed on the conductive substrate 210. A contact hole H is disposed on the conductive substrate 210. The contact hole H may extend to a predetermined region of the first conductivity-type semiconductor layer 270 by penetrating through the second electrode 240, the second conductivity-type semiconductor layer 250, and the active layer 260. A portion of the first electrode 220 may be connected to the first conductivity-type semiconductor layer 270 through the contact hole H. Accordingly, the conductive substrate 210 and the first conductivity-type semiconductor layer 270 may be electrically connected.

The second electrode 240 is disposed to be connected to the second conductivity-type semiconductor layer 250. The second electrode 240 may be electrically insulated from the first electrode 220 by an insulating layer 230. As illustrated in FIG. 22B, the insulating layer 230 is formed on a side surface of the contact hole H as well as between the first electrode 220 and the second electrode 240. Thus, the second electrode 240, the second conductivity-type semiconductor layer 250, and the active layer 260 exposed to the side wall of the contact hole H may be insulated from the second electrode 240.

A contact region C of the first conductivity-type semiconductor layer 270 is exposed by the contact hole H, and a portion of the second electrode 240 may be formed to be in contact with the contact region C through the contact hole H.

As illustrated in FIG. 22B, a portion of the second electrode 240 extends to the outside of the semiconductor laminate to provide an electrode formation region E. The electrode formation region E may include an electrode pad unit 247 for connecting an external power source to the second electrode 240. In FIG. 22B, a single electrode formation region E is illustrated, but if necessary, a plurality of electrode formation regions may be provided. As illustrated in FIG. 22A, the electrode formation region E may be formed in one corner of the semiconductor light emitting device 200 in order to maximize a light emission area. The second electrode 240 may be formed of a material which is in ohmic-contact with the second conductivity-type semiconductor layer 250 and has high reflectivity. As a material of the second electrode 240, a reflective electrode material may be used.

Figure 23:
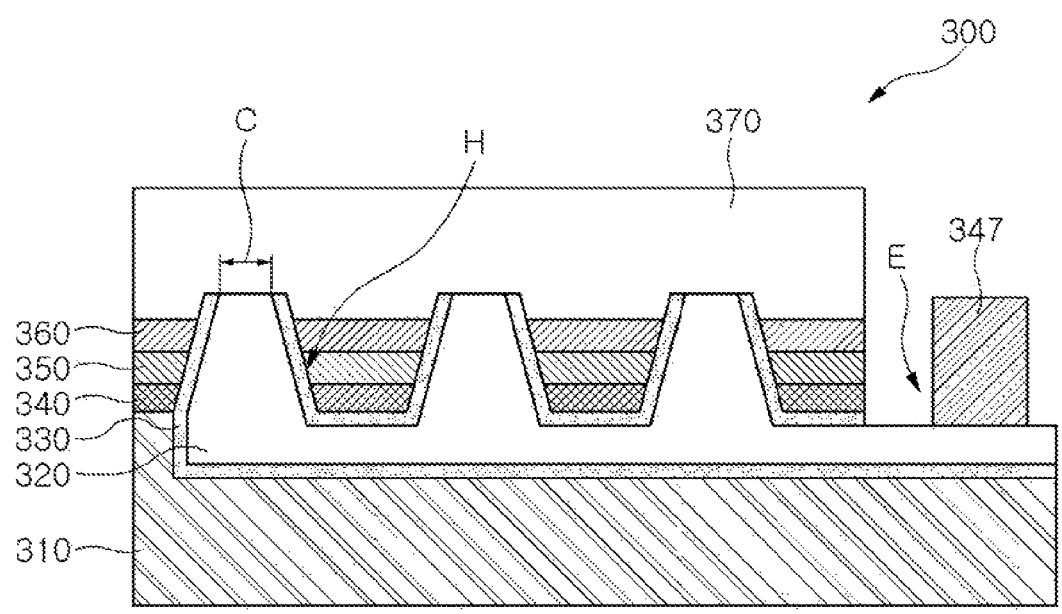
FIG. 23 is a cross-sectional view illustrating another example of a semiconductor light emitting device employable in a white light emitting apparatus according to an exemplary embodiment of the present inventive concept.

In a nitride semiconductor light emitting device 300 illustrated in FIG. 23, a first electrode 320 connected to a first conductivity-type semiconductor layer 370 may be exposed outwardly, unlike the nitride semiconductor light emitting device 200.

Similarly to the previous example, the nitride semiconductor light emitting device 300 illustrated in FIG. 23 includes a conductive substrate 310 and a semiconductor laminate positioned on the conductive substrate 310 and having a second conductivity-type semiconductor layer 350, an active layer 360, and a first conductivity-type semiconductor layer 370. A second electrode 340 may be disposed between the second conductivity-type semiconductor layer 350 and the conductive substrate 310.

A contact hole H is formed in the semiconductor laminate and a contact region C of the first conductivity-type semiconductor layer 370 is exposed, and the contact region C may be connected to a portion of the first electrode 320. The first electrode 320 may be electrically separated from the active layer 360, the second conductivity-type semiconductor layer 350, the second electrode 340, and the conductive substrate 310 by an insulating layer 330.

Unlike the previous example, a portion of the first electrode 320 may extend outwardly to provide an electrode formation region E, and an electrode pad unit 347 may be formed on the electrode formation region E. The second electrode 340 is directly connected to the conductive substrate 310 so that the conductive substrate 310 may be provided as an electrode connected to the second conductivity-type semiconductor layer 350.

Figure 24:
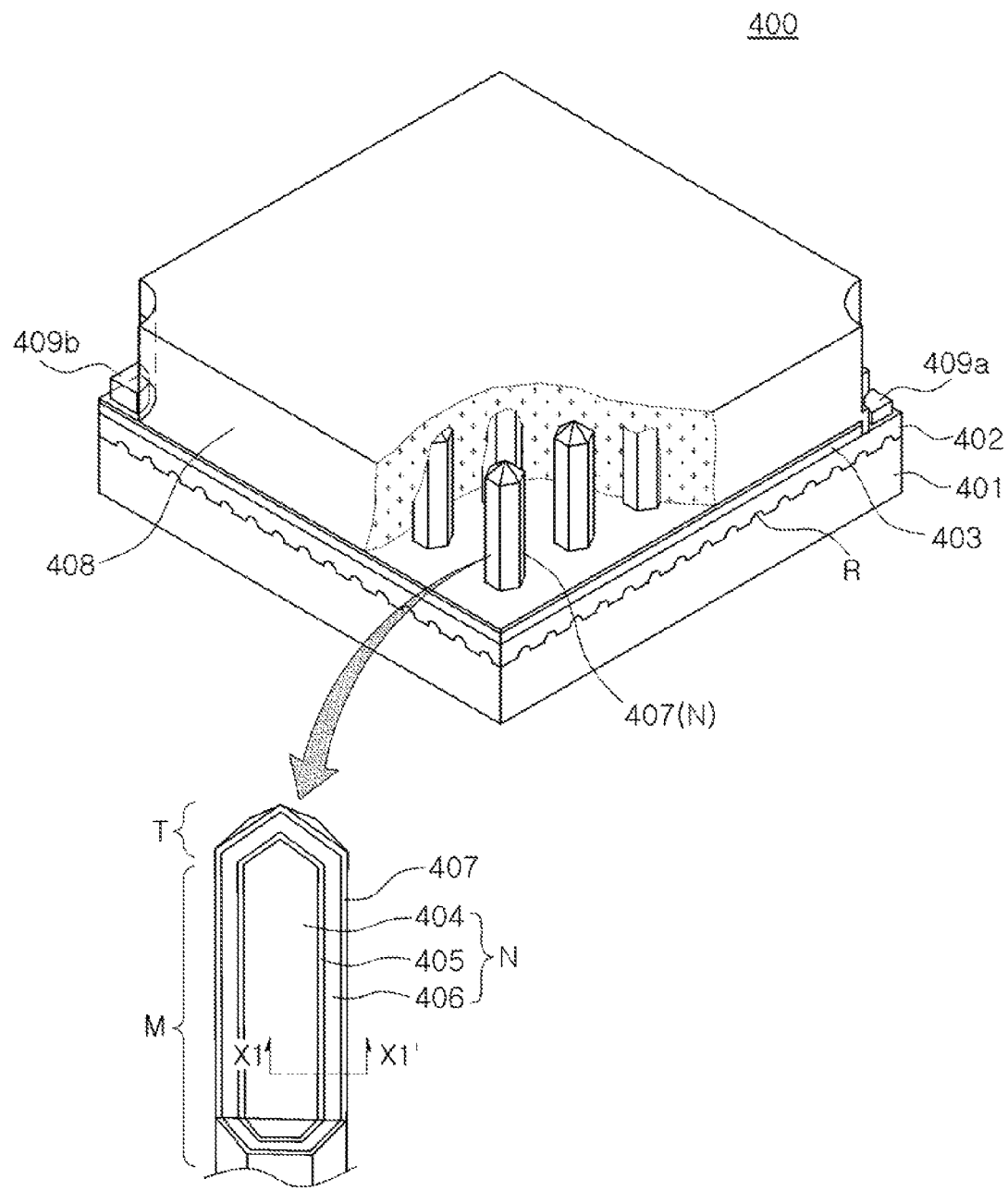
FIG. 24 is a perspective view schematically illustrating a semiconductor light emitting device employable in a white light emitting apparatus according to an exemplary embodiment of the present inventive concept.

FIG. 24 is a perspective view schematically illustrating a nanostructure semiconductor light emitting device employable in a light emitting apparatus according to an exemplary embodiment of the present inventive concept.

A nanostructure semiconductor light emitting device 400 illustrated in FIG. 24 may include a base layer 402 formed of a first conductivity-type semiconductor material and a plurality of light emitting nanostructures N formed on the base layer 402.

The nanostructure semiconductor light emitting device 400 may include a substrate 401 having an upper surface on which the base layer 402 is disposed. An irregular pattern R may be formed on the upper surface of the substrate 401. The irregular pattern R may enhance quality of a single crystal grown thereon, while improving light extraction efficiency. The substrate 401 may be an insulating, conductive, or semiconductor substrate. For example, the substrate 401 may be formed of sapphire, SiC, Si, $MgAl_2O_4$, MgO, $LiAlO_2$, $LiGaO_2$, or GaN.

The base layer 402 may include a first conductivity-type semiconductor layer and provide a growth surface of the light emitting nanostructures N. The base layer 402 may be a nitride semiconductor satisfying $Al_xIn_yGa_{1-x-y}N$, where $0 \le x<1$, $0 \le y<1$, and $0 \le x+y<1$, and may be doped with an n-type impurity such as silicon (Si). For example, the base layer 402 may be an n-type GaN.

An insulating layer 403 having openings may be formed on the base layer 402, and the openings may be provided to facilitate growth of the light emitting nanostructures N (in particular, nanocores 404). The nanocores 404 may be formed on regions of the base layer 402 exposed by the openings. The insulating layer 403 may be used as a mask for growing the nanocores 404. The insulating layer 403 may be formed of an insulating material such as $SiO_2$ or $SiN_x$.

The light emitting nanostructure N may include a main portion M having a hexagonal prism structure and a tip portion T positioned on the main portion M. The main portion M of the light emitting nanostructure N may have side surfaces, each of which being the same crystal plane, and the tip portion T of the light emitting nanostructure N may have a crystal plane different from that of the side surfaces of the light emitting nanostructure N. The tip portion T of the light emitting nanostructure N may have a hexagonal pyramid shape. Such a division of the nanostructure may be determined by the nanocore 404 in actuality, and the nanocore 404 may be understood by dividing it into the main portion M and the tip portion T.

The nanostructure semiconductor light emitting device 400 may include a contact electrode 407 connected to the second conductivity-type nitride semiconductor layer 406. The contact electrode 407 employed in the present exemplary embodiment may be formed of a transparent conductive material.

An insulating protective layer 408 may be formed on upper surfaces of the light emitting nanostructures N. The insulating protective layer 408 may be a passivation layer for protecting the light emitting nanostructures N. Also, the insulating protective layer 408 may be formed of a light transmissive material allowing light generated by the light emitting nanostructures N to be extracted.

The nanostructure semiconductor light emitting device 400 may include first and second electrodes 409a and 409b. The first electrode 409a may be disposed on an exposed region of the base layer 402 formed of the first conductivity-type semiconductor. Also, the second electrode 409b may be disposed on an exposed portion of an extended region of the contact electrode 407.

The light emitting nanostructure N may include the nanocore 404 formed of a first conductivity-type nitride semiconductor and an active layer 405 and a second conductivity-type nitride semiconductor layer 406 sequentially formed on a surface of the nanocore 404.

Figure 25:
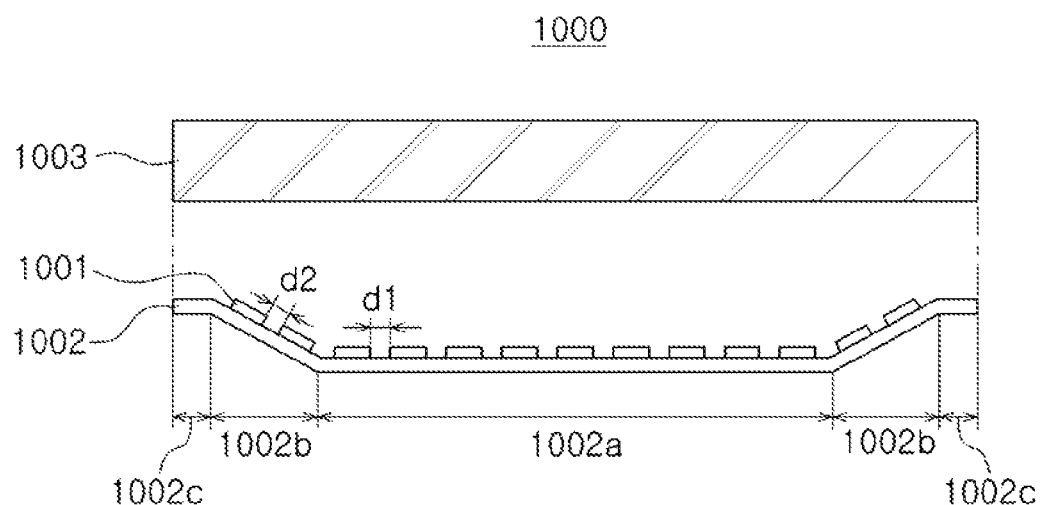
FIGS. 25 and 26 are cross-sectional views illustrating backlight units according to various exemplary embodiments of the present inventive concept.
Figure 26:
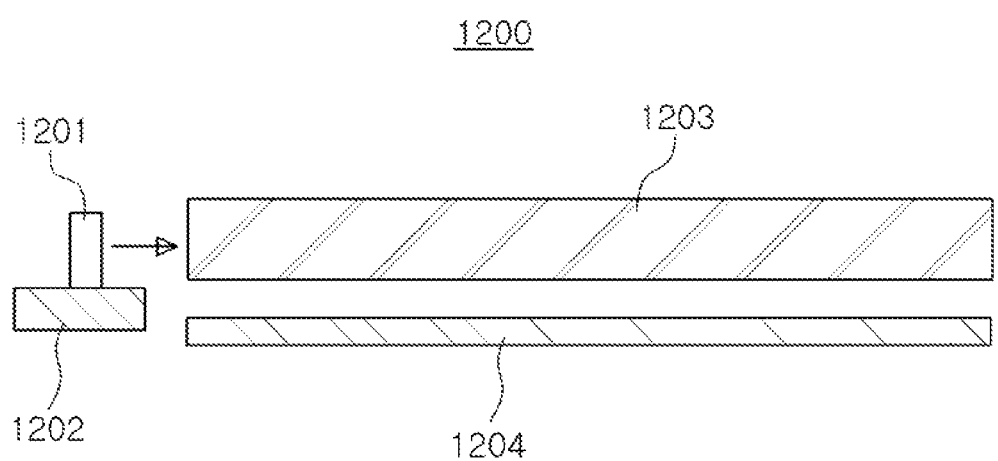

FIGS. 25 and 26 are views illustrating examples of backlight units employing a semiconductor light emitting device according to an exemplary embodiment of the present inventive concept.

Referring to FIG. 25, a backlight unit 1000 includes at least one light source 1001 mounted on a circuit board 1002 and at least one optical sheet 1003 disposed thereabove.

The optical source 1001 may be a white light emitting apparatus containing a fluoride phosphor composite according to an exemplary embodiment of the present disclosure, and the module in which the light source 1001 is mounted on the circuit board 1002 may be the light source module illustrated in FIGS. 21A and 21B.

The circuit board 1002 employed in the present exemplary embodiment may have a first planar portion 1002a corresponding to a main region, a sloped portion 1002b disposed around the first planar portion 1002a and bent in at least a portion thereof, and a second planar portion 1002c disposed on the edge of the circuit board 1002, namely, an outer side of the sloped portion 1002b. The light sources 1001 are arranged at a first interval d1 on the first planar portion 1002a, and one or more light sources 1001 may be arranged at a second interval d2 on the sloped portion 1002b. The first interval d1 may be equal to the second interval d2. A width of the sloped portion 1002b (or a length in the cross-section) may be smaller than that of the first planar portion 1002a and may be larger than a width of the second planar portion 1002c. Also, if necessary, at least one light source 1001 may be arranged on the second planar portion 1002c.

A slope of the sloped portion 1002b may be appropriately adjusted within a range from 0 degree to 90 degrees with respect to the first planar portion 1002a, and with this structure, the circuit board 1002 may maintain uniform brightness even in the vicinity of the edge of the optical sheet 1003.

Unlike the backlight unit 1000 illustrated in FIG. 25 in which the light sources 1001 may emit light toward a liquid crystal display (LCD) disposed thereabove, a backlight unit 1200 as another embodiment illustrated in FIG. 26 may be configured such that a light source 1201 mounted on a substrate 1202 may emit light in a lateral direction, and the emitted light may be incident to a light guide plate 1203 so as to be changed into as a planar light source. The light travelling to the light guide plate 1203 may be emitted upwards, and in order to enhance light extraction efficiency, a reflective layer 1204 may be disposed below the light guide plate 1203. The light source 1201 may be one of the light source illustrated in FIGS. 19A through 19C.

Unlike the exemplary embodiment described above, a phosphor may be disposed in a different component of a backlight unit rather than being directly disposed in a semiconductor light emitting device or package. Such exemplary embodiments are illustrated in FIGS. 27, 28A, and 28B.

Figure 27:
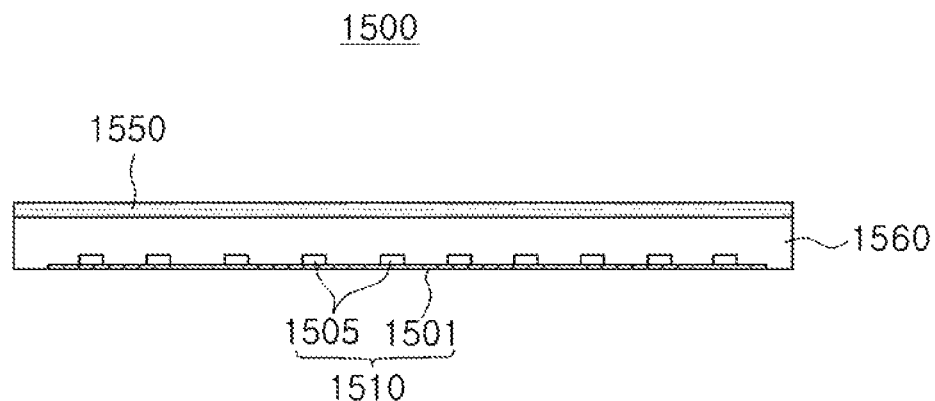
FIG. 27 is a cross-sectional view illustrating a back lit type backlight unit according to an exemplary embodiment of the present inventive concept.

As illustrated in FIG. 27, a back lit type backlight unit 1500 may include a phosphor film 1550 and light source modules 1510 arranged on a lower surface of the phosphor film 1550. The phosphor film 1550 may include a fluoride phosphor composite according to various embodiments of the present inventive concept.

The backlight unit 1500 may include a bottom case 1560 accommodating the light source modules 1510. In the present exemplary embodiment, the phosphor film 1550 is disposed on an upper surface of the bottom case 1560. At least a portion of the light emitted from the light source modules 1510 may convert its wavelength through the phosphor film 1550. The phosphor film 1550 may be manufactured as a separate film and applied to the backlight unit 1500. The phosphor film 1550 may be provided in a form of being integrally coupled with a light diffuser. The LED light source modules 1510 may include a circuit board 1501 and a plurality of semiconductor light emitting devices 1505 mounted on an upper surface of the circuit board 1501. The semiconductor light emitting apparatuses employed in the present exemplary embodiment may be semiconductor light emitting apparatuses not employing a phosphor. For example, the LED light source module 1510 may be a light emitting device illustrated in FIGS. 22A through 24.

Figure 28A:
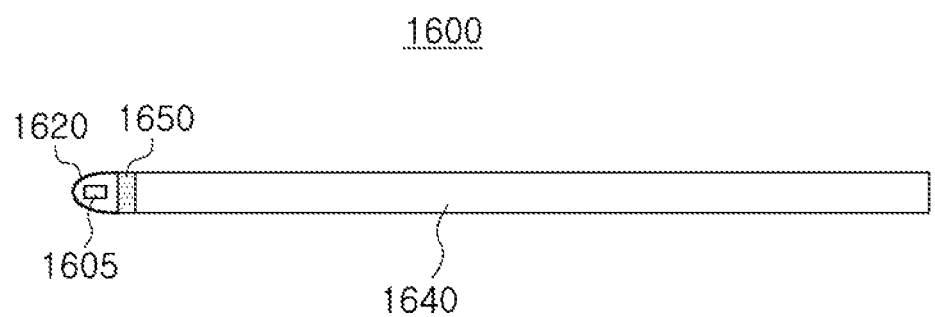
FIGS. 28A and 28B are cross-sectional views illustrating an edge-lit type backlight unit according to an exemplary embodiment of the present inventive concept.
Figure 28B:
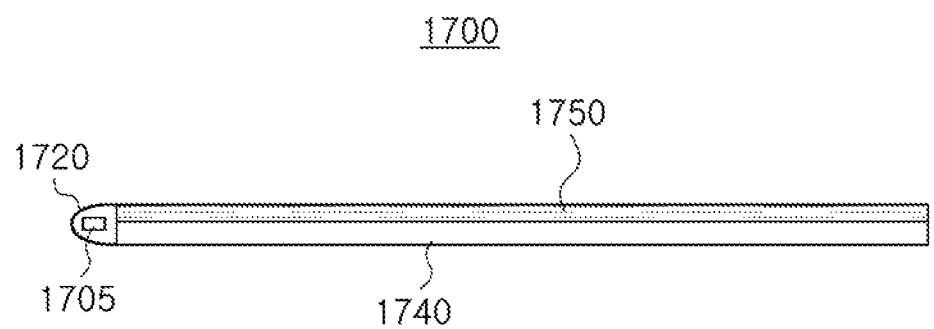

FIGS. 28A and 28B illustrate an edge-lit type backlight unit according to another exemplary embodiment of the present inventive concept.

An edge-lit type backlight unit 1600 illustrated in FIG. 28A may include a light guide plate 1640 and a semiconductor light emitting apparatus 1605 provided on one side of the light guide plate 1640. Light emitted from the semiconductor light emitting apparatus 1605 may be guided to the interior of the light guide plate 1640 by a reflective structure 1620. In the present exemplary embodiment, a phosphor film 1650 may be positioned between a side surface of the light guide plate 1640 and the semiconductor light emitting apparatus 1605. The phosphor film 1650 may include, for example, a fluoride phosphor composite described in various embodiments of the present disclosure.

FIG. 28B illustrates another embodiment. An edge-lit type backlight unit 1700 illustrated in FIG. 28B may include a light guide plate 1740 and a semiconductor light emitting apparatus 1705 and a reflective structure 1720 provided on one side of the light guide plate 1740. In the present exemplary embodiment, it is illustrated that a phosphor film 1750 is applied to a light emitting surface of the light guide plate 1740. The phosphor film 1750 may include, for example, a fluoride phosphor composite described in various embodiments of the present disclosure.

In this manner, the fluoride phosphor composite according to various embodiments may be applied to other elements such as the backlight unit, or the like, rather than being directly applied to the semiconductor light emitting apparatus.

Figure 29:
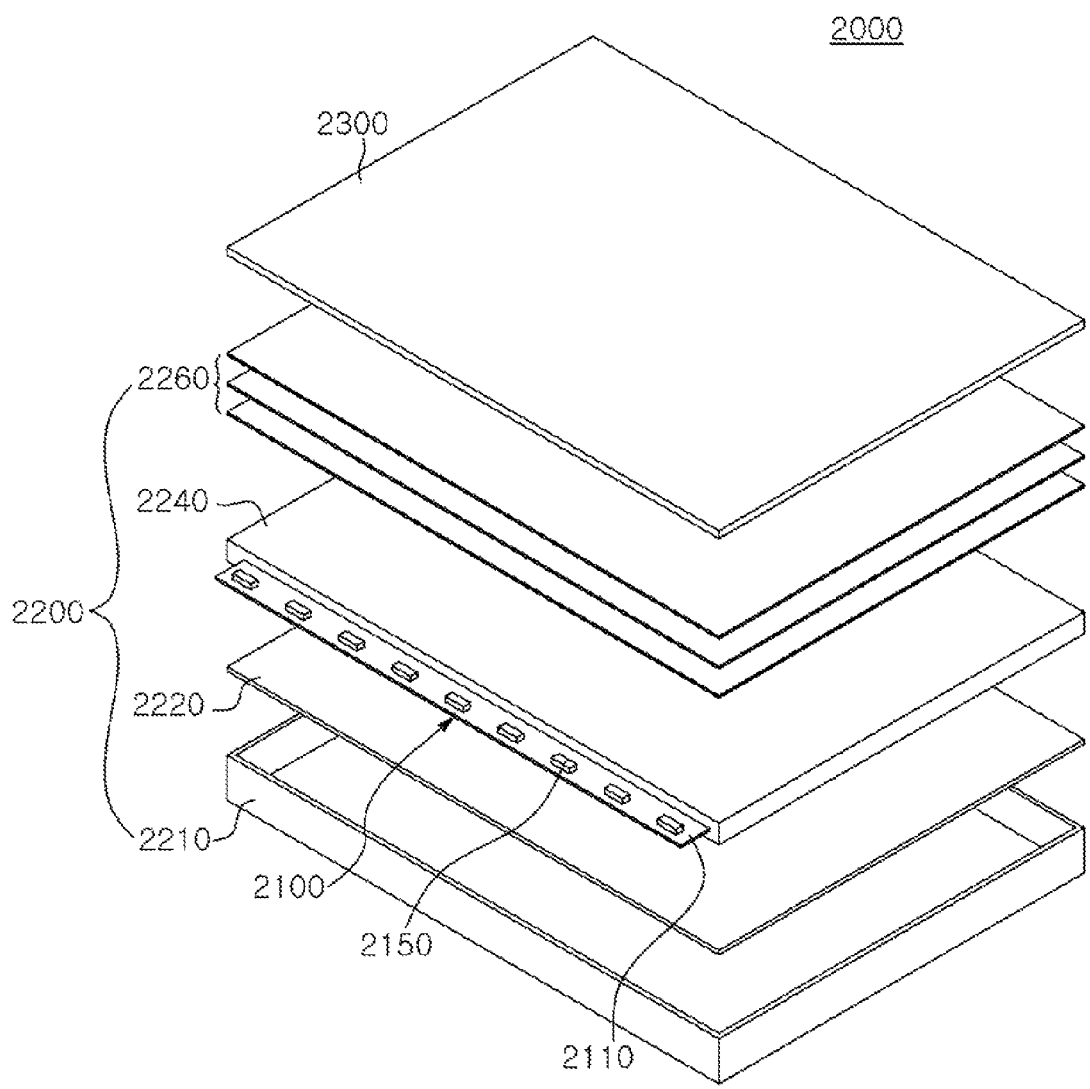
FIG. 29 is an exploded perspective view illustrating a display apparatus according to an exemplary embodiment of the present inventive concept.

FIG. 29 is an exploded perspective view schematically illustrating a display apparatus according to an exemplary embodiment of the present inventive concept.

Referring to FIG. 29, a display apparatus 2000 includes a backlight unit 2200 and an image display panel 2300 such as a liquid crystal panel. The backlight unit 2200 may include a light guide plate 2240 and an LED light source module 2100 provided on at least one side of the light guide plate 2240.

In the present exemplary embodiment, the backlight unit 2200 may further include a bottom case 2210 and a reflective plate 2220 positioned below the light guide plate 2240.

In order to meet demand for various optical characteristics, various types of optical sheets 2260 such as a diffusion sheet, a prism sheet, and a protective sheet may be provided between the light guide plate 2240 and the liquid crystal panel 2300.

The LED light source module 2100 includes a circuit board 2110 provided on at least one side of the light guide plate 2240 and a plurality of semiconductor light emitting apparatuses 2150 mounted on the circuit board 2110 and providing light to be incident to the light guiding plate 2240. The plurality of semiconductor light emitting apparatuses 2150 may be a package including a fluoride phosphor composite. The plurality of semiconductor light emitting apparatuses 2150 employed in the present exemplary embodiment may be mounted on a side adjacent to a light emitting surface, forming a side-view light emitting device package. For example, light emitting apparatuses 2150 may be the light emitting apparatuses described in FIGS. 19A through 21B. Alternatively, the backlight unit 2200 may adopt one or more components described in FIGS. 22A through 28B.

FIG. 30 is a view illustrating an example of a lighting device employing a semiconductor light emitting device package according to an exemplary embodiment of the present inventive concept.

A lighting device 3000 is illustrated, for example, as a bulb-type lamp in FIG. 30, and includes a light emitting module 3003, a driving unit 3008, and an external connection unit 3010. The lighting device 3000 may further include outer structures such as external and internal housings 3006 and 3009 and a cover unit 3007.

The light emitting module 3003 may include an LED light source 3001 mounted on a circuit board 3002. The LED light source may be a semiconductor light emitting apparatus described in various foregoing embodiments. For example, the first and second electrodes of the aforementioned semiconductor light emitting device may be electrically connected to an electrode pattern of the circuit board 3002. In the present embodiment, a single light source 3001 is mounted on the circuit board 3002, but a plurality of light sources may be mounted on the circuit board 3002. Also, the LED light source 3001 may include a fluoride phosphor composite described in various embodiments of this disclosure.

The external housing 3006 may serve as a heat dissipation unit and may include a heat dissipation plate 3004 and heat dissipation fins 3005. The heat dissipation plate 3004 may be disposed to be in direct contact with the light emitting module 3003 to enhance heat dissipation. The heat dissipation fins 3005 may surround the side surfaces of the lighting device 3000. The cover unit 3007 may be installed on the light emitting module 3003 and may have a convex lens shape. The driving unit 3008 is installed in the internal housing 3009 and connected to the external connection unit 3010 having a socket structure to receive power from an external power source.

The driving unit 3008 may serve to convert power into an appropriate current source for driving the semiconductor light emitting device 3001 of the light emitting module 3003, and provide the current to the semiconductor light emitting device 3001. For example, the driving unit 3008 may be configured as an AC-DC converter, a rectifying circuit component, or the like.

As set forth above in various embodiments, since the surface of a fluoride phosphor core containing $Mn^{4+}$ is thinly coated with an Mn-free fluoride shell and/or an organic material shell, the fluoride phosphor composite may gain high reliability and good optical properties (quantum efficiency and luminance). For example, the Mn-free fluoride shell may be continuously formed in a solution in which a fluoride phosphor core is synthesized. The Mn-free fluoride coating and the organic coating may be sequentially formed on a single fluoride phosphor core particle.

While exemplary embodiments have been shown and described above, it will be apparent to those skilled in the art that modifications and variations could be made without departing from the scope of the invention as defined by the appended claims.

What is claimed is:

1. A fluoride phosphor composite comprising:
a fluoride phosphor core particle expressed by an empirical formula of $A_xMF_y:Mn^{4+}$,
wherein, in the empirical formula, A is at least one selected from the group consisting of Li, Na, K, Rb, and Cs, M is at least one selected from the group consisting of Si, Ti, Zr, Hf, Ge, and Sn, a composition ratio (x) of A satisfies 2≤x≤3, a composition ratio (y) of F satisfies 4≤y≤7,
the fluoride phosphor core particle is coated with a Mn-free fluoride coating, and the Mn-free fluoride coating has a thickness less than or equal to 35% of the size of the fluoride phosphor composite,
wherein the Mn-free fluoride coating includes a fluoride expressed by an empirical formula of $A_xMF_y$.

2. The fluoride phosphor composite of claim 1, wherein the size of the fluoride phosphor composite ranges from 5 µm to 25 µm in diameter.

3. The fluoride phosphor composite of claim 2, wherein the thickness of the Mn-free fluoride coating ranges from 0.1 µm to 5 µm.

4. The fluoride phosphor composite of claim 3, wherein the thickness of the Mn-free fluoride coating is less than or equal to 20% of the size of the fluoride phosphor composite.

5. The fluoride phosphor composite of claim 1, wherein the Mn-free fluoride coating has a thickness equal to or greater than 1% of the size of the fluoride phosphor composite.

6. The fluoride phosphor composite of claim 1, wherein the external quantum efficiency of the fluoride phosphor composite is greater than the external quantum efficiency of the fluoride phosphor core.

7. The fluoride phosphor composite of claim 1, wherein the external quantum efficiency of the fluoride phosphor composite is less than 25% smaller than the external quantum efficiency of the fluoride phosphor core.

8. The fluoride phosphor composite of claim 1, wherein the internal quantum efficiency of the fluoride phosphor composite is greater than the internal quantum efficiency of the fluoride phosphor core particle before being coated with the fluoride coating.

9. The fluoride phosphor composite of claim 1, further comprising an organic coating applied to a surface of the Mn-free fluoride coating.

10. The fluoride phosphor composite of claim 9, wherein the organic coating includes a hydrophobic organic material physically adsorbed on a surface of the fluoride phosphor core particle.

11. The fluoride phosphor composite of claim 10, wherein the organic coating includes an organic compound having at least one functional group among a carboxyl group (—COOH) and an amine group (—$NH_2$) and having 4 to 18 carbon atoms.

12. The fluoride phosphor composite of claim 9, wherein after the fluoride phosphor composite is preserved in an environment having a temperature about 85° C. and relative humidity about 85% for 3 hours, when the fluoride phosphor composite is excited with light having a wavelength about 450 nm, external quantum efficiency of the fluoride phosphor composite is equal to or greater than 130% of external quantum efficiency of the fluoride phosphor core particle before being coated under the same conditions.

13. The fluoride phosphor composite of claim 9, wherein the organic coating is applied to an outside surface of the Mn-free fluoride coating.

14. A fluoride phosphor composite comprising:
a fluoride phosphor core particle expressed by an empirical formula of $A_xMF_y:Mn^{4+}$,
wherein, in the empirical formula, A is at least one selected from the group consisting of Li, Na, K, Rb, and Cs, M is at least one selected from the group consisting of Si, Ti, Zr, Hf, Ge, and Sn, a composition ratio (x) of A satisfies 2≤x≤3, a composition ratio (y) of F satisfies 4 ≤Y≤7,
the fluoride phosphor core particle is coated with a Mn-free fluoride coating, and the Mn-free fluoride coating has a thickness less than or equal to 35% of the size of the fluoride phosphor composite,
wherein, an external quantum efficiency of the fluoride phosphor composite is equal to or greater than 80% of an initial external quantum efficiency when the fluoride phosphor composite is excited with a light having a wavelength equal to about 450 nm after the fluoride phosphor composite is preserved in an environment having a temperature equal to about 85° C. and relative humidity equal to about 85% for 15 hours.

15. A fluoride phosphor composite comprising:
a fluoride phosphor core expressed by an empirical formula of $A_xMF_y:Mn^{4+}$, a first shell covering a surface of the fluoride phosphor core and having an Mn-free fluoride, and a second shell covering a surface of the first shell and having an organic material,
wherein, in the empirical formula, A is at least one selected from the group consisting of Li, Na, K, Rb, and Cs, M is at least one selected from the group consisting of Si, Ti, Zr, Hf, Ge, and Sn, a composition ratio (x) of A satisfies 2≤x≤3, and a composition ratio (y) of F satisfies 4≤y≤7.

16. The fluoride phosphor composite of claim 15, wherein the particle size of the fluoride phosphor core ranges from 5 µm to 25 µm with respect to a mass median diameter, and the thickness of the first shell ranges from 0.1 µm to 5 µm, and the thickness of the second shell is equal to or smaller than 0.1 µm.

17. The fluoride phosphor composite of claim 15, wherein the thickness of the first shell is less than or equal to 20% of the size of the fluoride phosphor composite and equal to or greater than 1% of the size of the fluoride phosphor composite.

18. The fluoride phosphor composite of claim 15, wherein the first shell includes a fluoride expressed by an empirical formula of $A_xMF_y$.

19. The fluoride phosphor composite of claim 15, wherein the external quantum efficiency of the fluoride phosphor composite is greater than the external quantum efficiency of the fluoride phosphor core before being coated with the first and second shells.

20. The fluoride phosphor composite of claim 15, wherein the internal quantum efficiency of the fluoride phosphor composite is greater than the internal quantum efficiency of the fluoride phosphor core before being coated with the first and second shells.

* * * * *